(12) United States Patent
Dillaway

(10) Patent No.: US 8,225,378 B2
(45) Date of Patent: *Jul. 17, 2012

(54) AUDITING AUTHORIZATION DECISIONS

(75) Inventor: Blair B. Dillaway, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/902,892

(22) Filed: Oct. 12, 2010

(65) Prior Publication Data

US 2011/0030038 A1 Feb. 3, 2011

Related U.S. Application Data

(63) Continuation of application No. 11/530,439, filed on Sep. 8, 2006, now Pat. No. 7,814,534.

(51) Int. Cl.
*G06F 21/00* (2006.01)

(52) U.S. Cl. ............. 726/4; 726/1; 726/2; 726/3; 726/5; 726/14; 713/155; 713/185; 717/117

(58) Field of Classification Search .................. 726/1–5, 726/14; 717/117; 713/155, 185
See application file for complete search history.

(56) References Cited

U.S. PATENT DOCUMENTS

| | | | |
|---|---|---|---|
| 4,868,877 A | 9/1989 | Fischer | |
| 5,214,702 A | 5/1993 | Fischer | |
| 5,649,099 A | 7/1997 | Theimer et al. | |
| 5,765,153 A | 6/1998 | Benantar et al. | |
| 6,189,103 B1 | 2/2001 | Nevarez et al. | |
| 6,216,231 B1 | 4/2001 | Stubblebine | |
| 6,256,734 B1 | 7/2001 | Blaze et al. | |
| 6,256,741 B1 | 7/2001 | Stubblebine | |
| 6,367,009 B1 | 4/2002 | Davis et al. | |
| 6,484,261 B1 | 11/2002 | Wiegel | |
| 6,779,120 B1 | 8/2004 | Valente et al. | |
| 6,895,503 B2 | 5/2005 | Tadayon et al. | |
| 6,931,530 B2 | 8/2005 | Pham et al. | |
| 6,976,009 B2 | 12/2005 | Tadayon et al. | |
| 7,085,741 B2 | 8/2006 | Lao et al. | |

(Continued)

FOREIGN PATENT DOCUMENTS

WO    WO0056027    9/2000

(Continued)

OTHER PUBLICATIONS

Peter Chapin et al, "Risk Assessment in Distributed Authorization", pp. 33-41, ACM, 2005.*

(Continued)

*Primary Examiner* — Nasser Goodarzi
*Assistant Examiner* — Shanto M Abedin
(74) *Attorney, Agent, or Firm* — Lee & Hayes, PLLC

(57) ABSTRACT

The auditing of authorization decisions is facilitated by integrating or coupling an audit policy to access control decisions. In an example implementation, an audit policy of an auditing scheme is coupled to a semantic framework of an access control scheme such that the audit policy is specified using at least a portion of the semantic framework. In another example implementation, audit policy rules include audit content rules that specify what audit information from any of the inputs, the outputs, or the internal data of authorization decisions is to be included in an audit record. In yet another example implementation, a semantic of an audit trigger rule comports with a semantic framework of an access request and of a logical evaluation for an authorization decision.

15 Claims, 10 Drawing Sheets

U.S. PATENT DOCUMENTS

| | | | |
|---|---|---|---|
| 7,127,605 B1 | 10/2006 | Montgomery et al. | |
| 7,162,633 B2 | 1/2007 | Wang et al. | |
| 7,260,715 B1 | 8/2007 | Pasieka | |
| 7,290,138 B2 | 10/2007 | Freeman et al. | |
| 7,426,635 B1 | 9/2008 | Parkhill et al. | |
| 7,437,421 B2 | 10/2008 | Bhogal et al. | |
| 7,506,364 B2 | 3/2009 | Vayman | |
| 7,509,489 B2 | 3/2009 | Kostal et al. | |
| 7,512,782 B2 | 3/2009 | Kaler et al. | |
| 7,533,265 B2 | 5/2009 | Ballinger et al. | |
| 7,543,140 B2 | 6/2009 | Dillaway et al. | |
| 7,644,284 B1 | 1/2010 | Stubblebine | |
| 7,823,192 B1 | 10/2010 | Fultz et al. | |
| 7,844,610 B2 | 11/2010 | Hillis et al. | |
| 2001/0018675 A1 | 8/2001 | Blaze et al. | |
| 2002/0087859 A1 | 7/2002 | Weeks et al. | |
| 2002/0109707 A1 | 8/2002 | Lao et al. | |
| 2002/0184160 A1 | 12/2002 | Tadayon et al. | |
| 2002/0184517 A1 | 12/2002 | Tadayon et al. | |
| 2003/0083877 A1 | 5/2003 | Sugimoto | |
| 2003/0110192 A1 | 6/2003 | Valente et al. | |
| 2003/0115292 A1* | 6/2003 | Griffin et al. | 709/219 |
| 2003/0120955 A1 | 6/2003 | Bartal et al. | |
| 2003/0149714 A1 | 8/2003 | Casati et al. | |
| 2003/0225697 A1* | 12/2003 | DeTreville | 705/51 |
| 2003/0229781 A1 | 12/2003 | Fox et al. | |
| 2004/0024764 A1* | 2/2004 | Hsu et al. | 707/9 |
| 2004/0034770 A1 | 2/2004 | Kaler et al. | |
| 2004/0034774 A1 | 2/2004 | Le Saint | |
| 2004/0064707 A1 | 4/2004 | McCann et al. | |
| 2004/0068757 A1 | 4/2004 | Heredia | |
| 2004/0122958 A1 | 6/2004 | Wardrop | |
| 2004/0123154 A1 | 6/2004 | Lippman et al. | |
| 2004/0128393 A1 | 7/2004 | Blakley, III et al. | |
| 2004/0128546 A1 | 7/2004 | Blakley, III et al. | |
| 2004/0139352 A1 | 7/2004 | Shewchuk et al. | |
| 2004/0162985 A1 | 8/2004 | Freeman et al. | |
| 2004/0181665 A1 | 9/2004 | Houser | |
| 2004/0221174 A1 | 11/2004 | Le Saint et al. | |
| 2004/0243811 A1 | 12/2004 | Frisch et al. | |
| 2004/0243835 A1 | 12/2004 | Terzis et al. | |
| 2004/0250112 A1 | 12/2004 | Valente et al. | |
| 2005/0015586 A1 | 1/2005 | Brickell | |
| 2005/0033813 A1 | 2/2005 | Bhogal et al. | |
| 2005/0055363 A1 | 3/2005 | Mather | |
| 2005/0066198 A1 | 3/2005 | Gelme et al. | |
| 2005/0071280 A1 | 3/2005 | Irwin et al. | |
| 2005/0079866 A1 | 4/2005 | Chen et al. | |
| 2005/0080766 A1 | 4/2005 | Ghatare | |
| 2005/0097060 A1 | 5/2005 | Lee et al. | |
| 2005/0108176 A1 | 5/2005 | Jarol et al. | |
| 2005/0132220 A1 | 6/2005 | Chang et al. | |
| 2005/0138357 A1 | 6/2005 | Swenson et al. | |
| 2005/0187877 A1 | 8/2005 | Tadayon et al. | |
| 2005/0188072 A1 | 8/2005 | Lee et al. | |
| 2005/0198326 A1 | 9/2005 | Schlimmer et al. | |
| 2005/0220304 A1 | 10/2005 | Lenoir et al. | |
| 2006/0005010 A1 | 1/2006 | Olsen et al. | |
| 2006/0005227 A1 | 1/2006 | Samuelsson et al. | |
| 2006/0015728 A1 | 1/2006 | Ballinger et al. | |
| 2006/0026667 A1 | 2/2006 | Bhide et al. | |
| 2006/0041421 A1 | 2/2006 | Ta et al. | |
| 2006/0041929 A1 | 2/2006 | Della-Libera et al. | |
| 2006/0048216 A1 | 3/2006 | Hinton et al. | |
| 2006/0075469 A1* | 4/2006 | Vayman | 726/2 |
| 2006/0101521 A1 | 5/2006 | Rabinovitch | |
| 2006/0106856 A1 | 5/2006 | Bermender et al. | |
| 2006/0129817 A1 | 6/2006 | Borneman et al. | |
| 2006/0136990 A1 | 6/2006 | Hinton et al. | |
| 2006/0156391 A1 | 7/2006 | Salowey | |
| 2006/0195690 A1 | 8/2006 | Kostal et al. | |
| 2006/0200664 A1 | 9/2006 | Whitehead et al. | |
| 2006/0206707 A1 | 9/2006 | Kostal et al. | |
| 2006/0206925 A1 | 9/2006 | Dillaway et al. | |
| 2006/0206931 A1* | 9/2006 | Dillaway et al. | 726/9 |
| 2006/0225055 A1 | 10/2006 | Tieu | |
| 2006/0230432 A1 | 10/2006 | Lee et al. | |
| 2006/0236382 A1 | 10/2006 | Hinton et al. | |
| 2006/0242075 A1 | 10/2006 | Ginter et al. | |
| 2006/0242162 A1 | 10/2006 | Conner et al. | |
| 2006/0242688 A1* | 10/2006 | Paramasivam et al. | 726/5 |
| 2006/0259776 A1 | 11/2006 | Johnson et al. | |
| 2007/0006284 A1 | 1/2007 | Adams et al. | |
| 2007/0043607 A1 | 2/2007 | Howard et al. | |
| 2007/0055887 A1 | 3/2007 | Cross et al. | |
| 2007/0056019 A1 | 3/2007 | Allen et al. | |
| 2007/0061872 A1 | 3/2007 | Carter | |
| 2007/0143835 A1 | 6/2007 | Cameron et al. | |
| 2007/0169172 A1 | 7/2007 | Backes et al. | |
| 2007/0199059 A1 | 8/2007 | Takehi | |
| 2007/0283411 A1 | 12/2007 | Paramasivam et al. | |
| 2007/0300285 A1 | 12/2007 | Fee et al. | |
| 2008/0066158 A1 | 3/2008 | Dillaway et al. | |
| 2008/0066159 A1 | 3/2008 | Dillaway et al. | |
| 2008/0066160 A1 | 3/2008 | Becker et al. | |
| 2008/0066169 A1 | 3/2008 | Dillaway et al. | |
| 2008/0066175 A1 | 3/2008 | Dillaway et al. | |
| 2008/0097748 A1 | 4/2008 | Haley et al. | |
| 2008/0127320 A1 | 5/2008 | De Lutiis et al. | |
| 2008/0172721 A1 | 7/2008 | Noh et al. | |
| 2009/0126022 A1 | 5/2009 | Sakaki | |

FOREIGN PATENT DOCUMENTS

| | | |
|---|---|---|
| WO | WO2008030876 A1 | 3/2008 |
| WO | WO2008031043 A1 | 3/2008 |

OTHER PUBLICATIONS

J. G. Cederquist et al, "An Audit Logic for Accountability", pp. 1-10, IEEE, 2005.*

John DeTreville, "Binder, a logic-based security language", pp. 1-9, IEEE, 2002.*

John Hughes et al, Security Assertion Markup Language (SAML) 2.0 Technical Overview, pp. 1-36, OASIS, 2004.*

Translated Chinese Office Action mailed Jan. 26, 2011 for Chinese Patent Application No. 200780033359.7, a counterpart foreign application for U.S. Appl. No. 11/530,446.

Office Action from the U.S. Patent and Trademark Office for U.S. Appl. No. 11/530,429, mailed on Jan. 19, 2011, 34 pgs.

Office Action from the U.S. Patent and Trademark Office for U.S. Appl. No. 11/530,446 mailed on Feb. 3, 2011, 35 pages.

Office Action from the U.S. Patent and Trademark Office for U.S. Appl. No. 11/530,556 mailed on Feb. 4, 2011, 8 pages.

Office Action from the U.S. Patent and Trademark Office for U.S. Appl. No. 11/530,433 mailed on Jan. 18, 2011, 35 pages.

Notice of Allowance from the U.S. Patent and Trademark Office for U.S. Appl. No. 11/530,438, mailed Apr. 4, 2011, 8 pages.

Office Action for U.S. Appl. No. 11/530,564, mailed on Apr. 12, 2011, Moritz Becker, "Security Language Expressions for Logic Resolution".

Non-Final Office Action for U.S. Appl. No. 11/530,443, mailed on May 26, 2011, Blair B. Dillaway, "Security Assertion Revocation".

Chadwick, "An Authorisation Interface for the GRID", In the Proceedings of the E-Science All Hands Meeting, Nottingham, Sep. 2003, 14 pgs.

Erdos, et al., "Shibboleth-Architecture", Draft Version 4, Nov. 2001, 39 pgs.

Office Action from the U.S. Patent and Trademark Office for U.S. Appl. No. 11/530,438, mailed Oct. 29, 2010, 31 pages.

Office Action from the U.S. Patent and Trademark Office for U.S. Appl. No. 11/530,443, mailed Dec. 7, 2010, 21 pgs.

Office Action from the U.S. Patent and Trademark Office for U.S. Appl. No. 11/530,543, mailed on Dec. 27, 2010, 17 pgs.

Lee, et al., "Security Assertion Exchange for the Agent on the Semantic Web", In the Proceedings of the IADIS International Conference WWW/Internet, Madrid, Spain, 2 Volumes, 2004, pp. 302-308 (9 pgs.).

Office Action from the U.S. Patent and Trademark Office for U.S. Appl. No. 11/530,427, mailed on Dec. 23, 2010, 33 pages.

Advisory Action for U.S. Appl. No. 11/530,427, mailed on Sep. 26, 2011, Blair B. Dillaway, "Variable Expressions in Security Assertions," 4 pages.

Advisory Action for U.S. Appl. No. 11/530,433, mailed on Sep. 27, 2011, Blair B. Dillaway, "Fact Qualifiers in Security Scenarios," 3 pages.
Translated Chinese Notice of Grant of Patent Right for Invention mailed Mar. 25, 2011 for Chinese Patent Application No. 200780033322.4 a counterpart foreign application for U.S. Appl. No. 11/530,438, 4 pages.
Translated Chinese Office Action mailed Aug. 25, 2011 for Chinese patent application No. 200780033359.7, a counterpart foreign application of U.S. Appl. No. 11/530,446, 15 pages.
ContentGuard, "eXtensibe rights Markup Language (XrML) 2.0 Specification Part 1: Primer," Nov. 20, 2001, pp. 1-39.
Extended European Search Report mailed Jul. 22, 2011 for European patent application No. 07842066.8, 8 pages.
Office Action from the U.S. Patent and Trademark Office for U.S. Appl. No. 11/530,556 mailed on Feb. 4, Moritz Becker, "Security Language Translations with Logic Resolution," 2011, 8 pages.
Kagal et al., "Trust-Based Security in Pervasive Computing Environments," IEEE Computer, Dec. 1, 2011, vol. 34, No. 12, pp. 154-157.
Office Action from the U.S. Patent and Trademark Office for U.S. Appl. No. 11/530,433 mailed on Jan. 18, 2011, Blair B. Dillaway, "Security Assertion Revocation," 35 pages.
Office Action from the U.S. Patent and Trademark Office for U.S. Appl. No. 11/530,446 mailed on Feb. 3, 2011, Blair B. Dillaway, "Controlling the Delegation of Rights," 35 pages.
Notice of Allowance from the U.S. Patent and Trademark Office for U.S. Appl. No. 11/530,438, mailed Apr. 4, 2011, Blair Dillaway, "Security Authorization Queries," 8 pages.
Office Action for U.S. Appl. No. 11/530,564, mailed on Apr. 12, 2011, Moritz Becker, "Security Language Expressions for Logic Resolution," 8 pages.
Non-Final Office Action for U.S. Appl. No. 11/530,443, mailed on May 26, 2011, Blair B. Dillaway, "Security Assertion Revocation," 15 pages.
Final Office Action for U.S. Appl. No. 11/530,427, mailed on Jun. 29, 2011, Blair B. Dillaway, "Variable Expressions in Security Assertions," 23 pages.
Final Office Action for U.S. Appl. No. 11/530,429, mailed on Jul. 8, 2011, Blair B. Dillaway, "Authorization Decisions with Principal Attributes," 23 pages.
Final Office Action for U.S. Appl. No. 11/530,433, mailed on Jul. 8, 2011, Blair B. Dillaway, "Fact Qualifiers in Security Scenarios," 20 pages.
Non-Final Office Action for U.S. Appl. No. 11/530,446, mailed on Sep. 15, 2011, Blair B. Dillaway, "Controlling the Delegation of Rights," 30 pages.
Upadhyay et al., "Generic Security Service API Version 2: Java Bindings Update: draft-ietf-kitten-rfc2853bis-01.txt," IETF Standard-Working-Draft, Internet Engineering Task Force, IETF, CH, vol. kitten, No. 1, Jan. 27, 2006, 102 pages.
Wainer et al., "A Fine-Grained, Controllable, User-to-User Delegatino Method in RBAC," Proceedings of the Tenth ACM Symposium on Access Control Models and Technologies, SACMAT, Jan. 1, 2005, 8 pages.
Yin et al., "A Rule-based Framework for Role0based Constrained Delegation," Proceedings of the 3rd International Conference on Information Security, INFOSECU, Jan. 1, 2004, pp. 186-191.
Ardagna, et al., "XML-based Access Control Languages ", retrieved at <<http://seclab.dti.unimi.it/Papers/RI-3.pdf>>, Universita degli Studi di Milano, Italy, pp. 1-14, 2004.
Bindings for the OASIS Security Assertion Markup Language (SSML) V2.0, OASIS Standard , Mar. 15, 2005.
Blaze, et al., "The Role of Trust Management in Distributed Systems Security", Secure Internet Programming, 1999, pp. 185-210.
Farrell et al., "Assertions and Protocols for the OASIS Security Assertion Markup Language (SAML) V2.0", OASIS Open, Aug. 2004, pp#1-pp#87.
Jim, "SD3: A Trust Management System with Certified Evaluation", Proceedings of the 2001 IEEE Symposium on Security and Privacy, 2001, available at <<http://www.research.att.com/~trevor/papers/JimOakland2001.pdf#search=%22%22SD3%3A%20A%20Trust%20Management%20System%20with%20Certified%20Evaluation%22%22>>, pp. 106-115.

Li, et al., "Datalog with Constraints: A Foundation for Trust Management Languages", Proc. PADL, 2003, available at <<http://www.cs.purdue.edu/homes/ninghui/papers/cdatalog_pad103.pdf#search=%22%22Datalog%20with%20Constraints%3A%20A%20Foundation%20For%20Trust%20Management%20Languages%22%22>>, pp. 58-73.
Li, et al., "Design of a Role-Based Trust Management Framework", Proceedings of the 2002 IEEE Symposium on Security and Privacy, 2002, available at <<http://www.cs.purdue.edu/homes/ninghui/papers/rt_oakland02.pdf#search=%22%22Design%20of%20a%20Role-Based%20Trust%20Management%20Framework%22%22>>, pp. 114-130.
Office Action from the U.S. Patent and Trademark Office for U.S. Appl. No. 11/530,556, mailed on Aug. 23, 2010, 14pages.
Ribeiro, et al., "SPL: An access control language for security policies with complex constraints", retrieved at <<http://www.gsd.inesc-id.pt/~cnr/splii.pdf>>, IST/INESC, Portugal, pp. 1-22, 1999.
Wu, et al., "Evaluation of Authorization-Authentication Tools: PERMIS, OASIS, XACML, and SHIBOLETH", Technical Report CS-TR-935, University of Newcastle upon Tyne, 2005.
Abadi, "Logic in Access Control," Proceedings 18th Annual IEEE Symposium on Logic in Computer Science, Jun. 22-25, 2003, Ottawa, Ontario, Canada, pp. 228-233.
Becker et al., "SecPAL: Design and Semantics of a Decentralized Authorization Language—Technical Report MSR-TR-2006-120," Sep. 1, 2006, Microsoft Research, Cambridge, UK, retrieved from the Internet at <<http://courses.cs.vt.edu/cs5204/fall10-kafura-NVC/Papers/Security/SecPal-Reference.pdf>> on Dec. 21, 2011, 46 pages.
Chen et al., "Tabled Evaluations with Delaying for General Logic Programs," Journal of the ACM, vol. 43, No. 1, Jan. 1996, pp. 20-74.
European Office Action mailed Dec. 22, 2011 for European patent application No. 07841896.9, a counterpart foreign application of US patent No. 8,060,931, 4 pages.
Extended European Search Report mailed Jan. 18, 2012 for European patent application No. 07842186.4, 9 pages.
Pimlott et al., "Soutei, a Logic-Based Trust-Management System," Functional and Logic Programming, 8th International Symposium, FLOPS 2006 Proceedings, LNCS 3945, Apr. 24-26, 2006, pp. 130-145.
Japanese Office Action mailed Jan. 24, 2012 for Japanese patent application No. 2009-527617, a counterpart foreign application of U.S. Appl. No. 11/530,556, 14 pages.
Geuer-Pollmann et al., "Web Services and Web Service Security Standards," Elsevier Advanced Technology Publications, Journal of Information Security Technology Report, Jan. 2005, vol. 10, Issue 1, pp. 15-24.
Haidar et al., "An Extended RBAC Profile of XACML," In the Proceedings of the 3rd ACM Workshop on Secure Web Services, 2006, pp. 13-22.
Ardagna, et al., "XML-based Access Control Languages ", retrieved at <<http://seclab.dti.unimi.it/Papers/Ri-3.pdf>>, Universita degli Studi di Milano, Italy, pp. 1-14, Information Security Tech. Report, Jul. 2004.
Becker, et al., "Cassandra: Distributed Access Control Policies with Tunable Expressiveness", IEEE 5th International Workshop on Policies for Distributed Systems and Networks, 2004, pp. 159-168.
Becker, et al., "Cassandra: Flexible Trust Management, Applied to Electronic Health Records", IEEE Computer Security Foundations Workshop, 2004, pp. 139-154.
Bindings for the OASIS Security Assertion Markup Language (SAML) V2.0, OASIS Standard, Mar. 15, 2005.
Blaze, et al., "Decentralized Trust Management", IEEE Symposium on Security and Privacy, 1996, pp. 164-173.
Blaze, et al.,"The Role of Trust Management in Distributed Systems Security", Secure Internet Programming, 1999, pp. 185-210.
Cederquist et al., "An Audit Logic for Accountability", IEEE, 2005, pp#1-pp#10.
"ContentGuard", eXtensible rights Markup Language (XrML) 2.0 Specificaton Part II: Core Schema, 2001, available at www.xrml.org.
Dai et al., "Logic Based Authorization Policy Engineering", 2001, pp#1-pp#9.

Damianou, et al., "Ponder: A Language for Specifying Security and Management Policies for Distributed Systems", retrieved at <<http://www.doc.ic.ac.uk/~ncd/policies/files/PonderSpec.pdf>>, Imperial College of Science, Technology and Medicine, London, U.K, Oct. 20, 2000, pp. 1-49.

DeTreville, "Binder, A Logic-Based Security Language", IEEE Symposium on Security and Privacy, 2002, pp. 105-113.

Ellison, et al., "RFC 2693—SPKI Certificate Theory", available at <<http://www.ietf.org/rfc/rfc2693.txt>>, accessed on Sep. 27, 2006, 38 pages.

Farrell et al., "Assertions and Protocols for the OASIS Security Assertion Markup Language (SAML) V2.0", OASIS Open, 2004, Aug. 2004, pp#1-pp#87.

Office Action from the U.S. Patent and Trademark Office for U.S. Appl. No. 11/530,433, mailed Mar. 1, 2009, 26 pages.

Office Action from the U.S. Patent and Trademark Office for U.S. Appl. No. 11/530,429, mailed on Mar. 2, 2010, 21 pages.

Office Action from the U.S. Patent and Trademark Office for U.S. Appl. No. 11/530,427, mailed Mar. 3, 2010, 26 pages.

Office Action from the U.S. Patent and Trademark Office for U.S. Appl. No. 11/530,446, mailed on Jul. 30, 2010, 29 pages.

Hallam-Baker et al., "Web Services Security: SAML Token Profile", OASIS Open, Sep. 23, 2002, pp#1-pp#25.

Hallam-Barker, "Security Assertion Markup Language Straw-man Architecture", VeriSign, 2001, Feb. 16, 2001, pp#1-pp#17.

Halpern, et al., "Using First-Order Logic to Reason About Policies", IEEE Computer Security Foundations Workshop, 2003, available at <<http://arxiv.org/PS_cache/cs/pdf/0601/0601034.pdf>>, pp. 187-201.

Hughes et al., "Security Assertion Markup Language (SAML) 2.0 Technical Overview", OASIS, 2004, pp#1-pp#36.

Jim, "SD3: A Trust Management System with Certified Evaluation", Proceedings of the 2001 IEEE Symposium on Security and Privacy, 2001, available at <<http://www.research.att.com/~trevor/papers/JimOakland2001.pdf#search=%22%22SD3%3A%20A%20Trust%20Management%20System%20with%20Certified%20Evaluation%22%22>>, pp. 106-115.

Keoh et al., "Towards Flexible Credential Verification in Mobile Ad-hoc Networks", ACM 2002, POMC '02, Oct. 30-31, 2002, pp#58-pp#65.

Li, et al. "A Practically Implementable and Tractable Delegation Logic", IEEE Symposium on Security and Privacy, 2000, available at <<http://www.cs.purdue.edu/homes/ninghui/papers/dl_oakland00.pdf>>, pp. 27-42.

Li, et al., "Datalog with Constraints: A Foundation For Trust Management Languages", Proc. PADL, 2003, available at <<http://www.cs.purdue.edu/homes/ninghui/papers/cdatalog_padl03.pdf#search=%22%22Datalog%20with%20Constraints%3A%20A%20Foundation%20For%20Trust%20Management%20 Languages%22%22>>, pp. 58-73.

Li, et al., "Design of a Role-Based Trust Management Framework", Proceedings of the 2002 IEEE Symposium on Security and Privacy, 2002, available at <<http://www.cs.purdue.edu/homes/ninghui/papers/rt_oakland02.pdf#search=%22%22Design%20of%20a%20Role-Based%20Trust%20Management%20Framework%22%22>>, pp. 114-130.

Navarro et al., "Constrained delegation in XML-based Access Control and Digital Right Management Standards", Communication, Network and Information Security 2003, pp#1-pp#6.

Office Action from the U.S. Patent and Trademark Office for U.S. Appl. No. 11/530,446, mailed on Feb. 24, 2010, 30 pages.

Office Action from the U.S. Patent and Trademark Office for U.S. Appl. No. 11/530,439, mailed on Mar. 5, 2010, 32 pages.

Office Action from the U.S. Patent and Trademark Office for U.S. Appl. No. 11/530,438, mailed May 20, 2010, 35 pages.

Office Action from the U.S. Patent and Trademark Office for U.S. Appl. No. 11/530,443, mailed on Jun. 1, 2010, 30 pages.

Office Action from the U.S. Patent and Trademark Office for U.S. Appl. No. 11/530,543, mailed on Jul. 8, 2010, 12 pages.

Office Action from the U.S. Patent and Trademark Office for U.S. Appl. No. 11/530,427, mailed on Aug. 20, 2010, 23 pages.

Office Action from the U.S. Patent and Trademark Office for U.S. Appl. No. 11/530,429, mailed on Aug. 20, 2009, 24 pages.

Office Action from the U.S. Patent and Trademark Office for U.S. Appl. No. 11/530,433, mailed on Aug. 21, 2009, 24 pages.

Office Action from the U.S. Patent and Trademark Office for U.S. Appl. No. 11/530,556, mailed on Aug. 23, 2010, 14 pages.

Office Action from the U.S. Patent and Trademark Office for U.S. Appl. No. 11/530,564, mailed on Sep. 15, 2010, 17 pages.

Notice of Allowance from the U.S. Patent and Trademark Office for U.S. Appl. No. 11/530,439, mailed Aug. 23, 2010, 22 pages.

"OASIS, Security Assertion Markup Language (SAML)", accessed on Sep. 27, 2006 from <<www.oasis-open.org/committees/security>>, 8 pages.

"OASIS", eXtensible Access Control Markup Language (XACML) Version 2.0 Core Specification, 2005, accessed on Sep. 27, 2006 at <<www.oasis-open.org/committees/xacml/>>, 6 pages.

Pfenning et al., "System Description: Twelf—A Meta-Logical Framework for Deductive Systems", 1999, pp#1-pp#5.

"RFC 3280—Internet X.409 Public Key Infrastructure Certificate and Certificate Revocation List (CRL) Profile", IETF, retrieved on Sep. 22, 2006 from <<http://www.faqs.org/rfcs/rfc3280.html>>, Apr. 2002, 8 pages.

Ribeiro, et al., "SPL: An access control language for security policies with comples constraints", retrieved at <<http://www.gsd.inesc-id.pt/~cnr/splii.pdf>>, IST/INESC, Portugal, pp. 1-22.

Rivest, et al., "SDSI—A Simple Distributed Security Infrastructure", available at <<http://theory.lcs.mit.edu/~rivest/sdsi10.ps>>, Apr. 30, 1996, pp. 1-37.

"Security Assertion Markup Language (SAML) 2.0 Technical Overview", OASIS, Working Draft 01, Jul. 22, 2004, pp. 1-36.

Stoller, "Trust Management A Tutorial", Stony Brook University, State University of New York, May 2006, pp#1-pp#118.

Wang et al., "Extending the Security Assertion Markup Language to Support Delegation for Web Services and Grid Services", IEEE Internation Conference on Web Services 2005, Orlando, Fl, Jul. 12-15, 2005, pp#1-pp#8.

Whitehead et al., "By Reason and Authority: A System for Authorization of Proof-Carrying Code", IEEE Computer Secuirty Foundations Workshop (CSFW'04) 2004, pp#1-pp#15.

Wu, et al., "Evaluation of Authorization-Authentication Tools: PERMIS, OASIS, EACML, and SHIBOLETH", Technical Report CS-TR-935, University of Newcastle upon Tyne, 2005.

* cited by examiner

Example Assertion Format

AUDITING AUTHORIZATION DECISIONS

RELATED APPLICATION

This application is a continuation of and claims the benefit of priority of U.S. patent application Ser. No. 11/530,439, filed on Sep. 9, 2006, the disclosure of which is incorporated by reference herein.

BACKGROUND

Computers and other electronic devices are pervasive in the professional and personal lives of people. In professional settings, people exchange and share confidential information during project collaborations. In personal settings, people engage in electronic commerce and the transmission of private information. In these and many other instances, electronic security is deemed to be important.

Electronic security paradigms can keep professional information confidential and personal information private. Electronic security paradigms may involve some level of encryption and/or protection against malware, such as viruses, worms, and spyware. Both encryption of information and protection from malware have historically received significant attention, especially in the last few years.

However, controlling access to information is an equally important aspect of securing the safety of electronic information. This is particularly true for scenarios in which benefits are derived from the sharing and/or transferring of electronic information. In such scenarios, certain people are to be granted access while others are to be excluded.

Access control has been a common feature of shared computers and application servers since the early time-shared systems. There are a number of different approaches that have been used to control access to information. They share a common foundation in combining authentication of the entity requesting access to some resource with a mechanism of authorizing the allowed access. Authentication mechanisms include passwords, Kerberos, and x.509 certificates. Their purpose is to allow a resource-controlling entity to positively identify the requesting entity or information about the entity that it requires.

Authorization examples include access control lists (ACLs) and policy-based mechanisms such as the eXtensible Access Control Markup Language (XACML) or the PrivilEge and Role Management Infrastructure (PERMIS). These mechanisms define what entities may access a given resource, such as files in a file system, hardware devices, database information, and so forth. They perform this authorization by providing a mapping between authenticated information about a requestor and the allowed access to a resource.

As computer systems have become more universally connected over large networks such as the Internet, these mechanisms have proven to be somewhat limited and inflexible in dealing with evolving access control requirements. Systems of geographically dispersed users and computer resources, including those that span multiple administrative domains, in particular present a number of challenges that are poorly addressed by currently-deployed technology.

SUMMARY

The auditing of authorization decisions is facilitated by integrating or coupling an audit policy to access control decisions. In an example implementation, an audit policy of an auditing scheme is coupled to a semantic framework of an access control scheme such that the audit policy is specified using at least a portion of the semantic framework. In another example implementation, audit policy rules include audit content rules that specify what audit information from any of the inputs, the outputs, or the internal data of authorization decisions is to be included in an audit record. In yet another example implementation, a semantic of an audit trigger rule comports with a semantic framework of an access request and of a logical evaluation for an authorization decision.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, protocol, etc. implementations are described herein.

BRIEF DESCRIPTION OF THE DRAWINGS

The same numbers are used throughout the drawings to reference like and/or corresponding aspects, features, and components.

DETAILED DESCRIPTION

Example Security Environments

Figure 1:
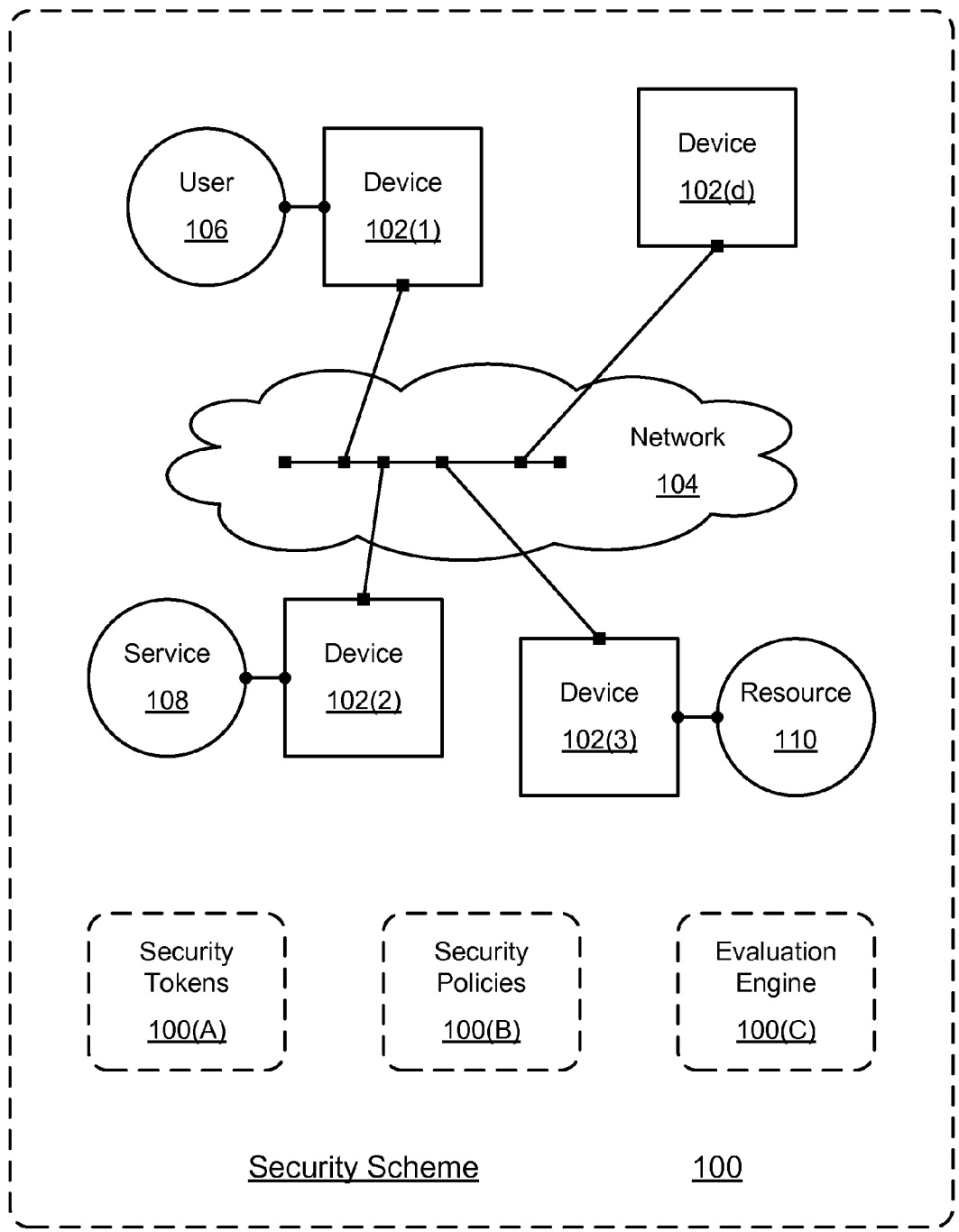
FIG. 1 is a block diagram illustrating an example general environment in which an example security scheme may be implemented.

FIG. 1 is a block diagram illustrating an example general environment in which an example security scheme 100 may be implemented. Security scheme 100 represents an integrated approach to security. As illustrated, security scheme 100 includes a number of security concepts: security tokens 100(A), security policies 100(B), and an evaluation engine 100(C). Generally, security tokens 100(A) and security policies 100(B) jointly provide inputs to evaluation engine 100(C). Evaluation engine 100(C) accepts the inputs and produces an authorization output that indicates if access to some resource should be permitted or denied.

In a described implementation, security scheme 100 can be overlaid and/or integrated with one or more devices 102, which can be comprised of hardware, software, firmware, some combination thereof, and so forth. As illustrated, "d" devices, with "d" being some integer, are interconnected over one or more networks 104. More specifically, device 102(1), device 102(2), device 102(3) . . . device 102(d) are capable of communicating over network 104.

Each device 102 may be any device that is capable of implementing at least a part of security scheme 100. Examples of such devices include, but are not limited to, computers (e.g., a client computer, a server computer, a personal computer, a workstation, a desktop, a laptop, a palmtop, etc.), game machines (e.g., a console, a portable game device, etc.), set-top boxes, televisions, consumer electronics (e.g., DVD player/recorders, camcorders, digital video recorders (DVRs), etc.), personal digital assistants (PDAs), mobile phones, portable media players, some combination thereof, and so forth. An example electronic device is described herein below with particular reference to FIG. 4.

Network 104 may be formed from any one or more networks that are linked together and/or overlaid on top of each other. Examples of networks 104 include, but are not limited to, an internet, a telephone network, an Ethernet, a local area network (LAN), a wide area network (WAN), a cable network, a fibre network, a digital subscriber line (DSL) network, a cellular network, a Wi-Fi® network, a WiMAX® network, a virtual private network (VPN), some combination thereof, and so forth. Network 104 may include multiple domains, one or more grid networks, and so forth. Each of these networks or combination of networks may be operating in accordance with any networking standard.

As illustrated, device 102(1) corresponds to a user 106 that is interacting with it. Device 102(2) corresponds to a service 108 that is executing on it. Device 102(3) is associated with a resource 110. Resource 110 may be part of device 102(3) or separate from device 102(3).

User 106, service 108, and a machine such as any given device 102 form a non-exhaustive list of example entities. Entities, from time to time, may wish to access resource 110. Security scheme 100 ensures that entities that are properly authenticated and authorized are permitted to access resource 110 while other entities are prevented from accessing resource 110.

Figure 2:
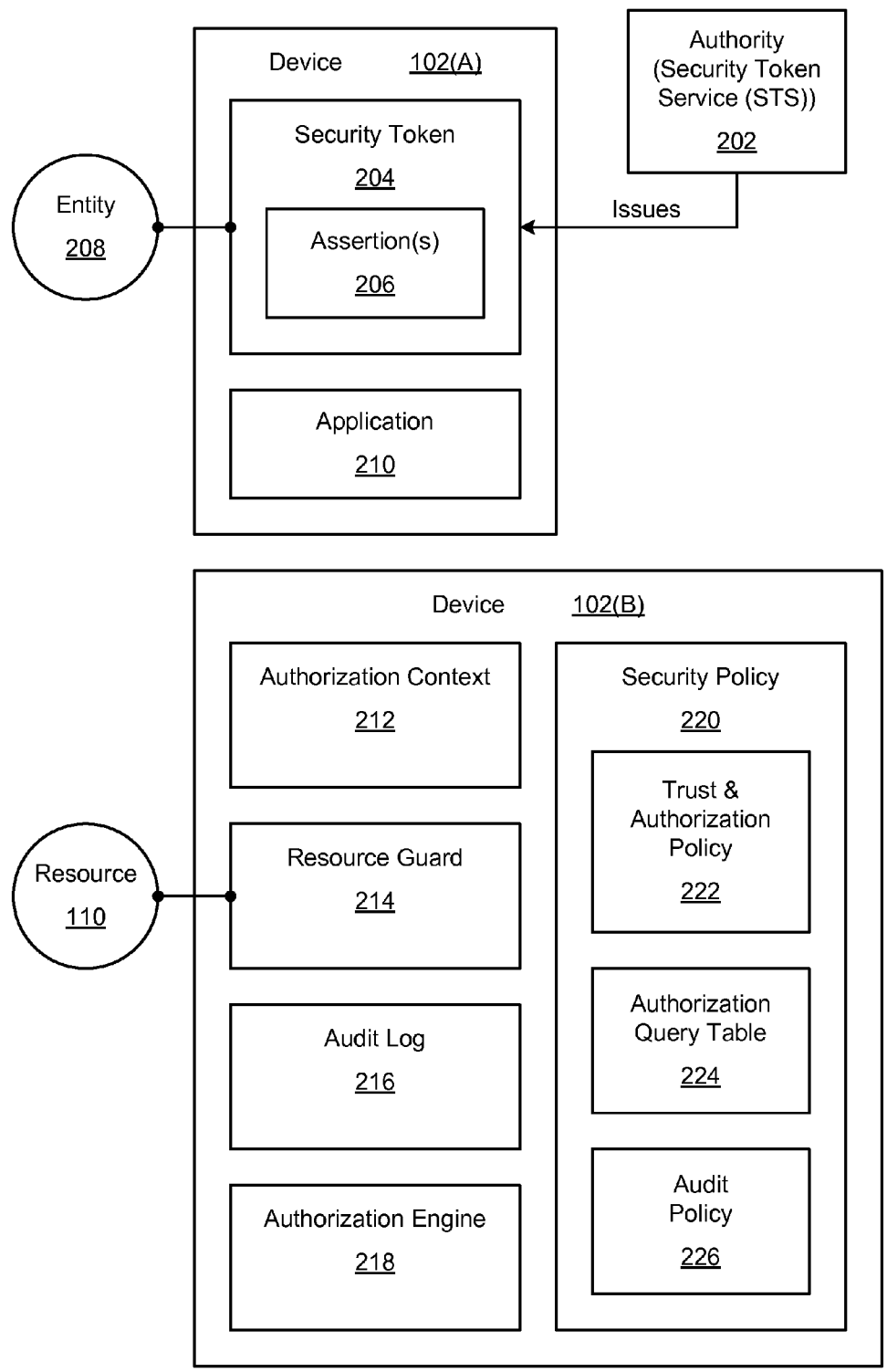
FIG. 2 is a block diagram illustrating an example security environment having two devices and a number of example security-related components.

FIG. 2 is a block diagram illustrating an example security environment 200 having two devices 102(A) and 102(B) and a number of example security-related components. Security environment 200 also includes an authority 202, such as a security token service (STS) authority. Device 102(A) corresponds to an entity 208. Device 102(B) is associated with resource 110. Although a security scheme 100 may be implemented in more complex environments, this relatively-simple two-device security environment 200 is used to describe example security-related components.

As illustrated, device 102(A) includes two security-related components: a security token 204 and an application 210. Security token 204 includes one or more assertions 206. Device 102(B) includes five security-related components: an authorization context 212, a resource guard 214, an audit log 216, an authorization engine 218, and a security policy 220. Security policy 220 includes a trust and authorization policy 222, an authorization query table 224, and an audit policy 226.

Each device 102 may be configured differently and still be capable of implementing all or a part of security scheme 100. For example, device 102(A) may have multiple security tokens 204 and/or applications 210. As another example, device 102(B) may not include an audit log 216 or an audit policy 226. Other configurations are also possible.

In a described implementation, authority 202 issues security token 204 having assertions 206 to entity 208. Assertions 206 are described herein below, including in the section entitled "Security Policy Assertion Language Example Characteristics". Entity 208 is therefore associated with security token 204. In operation, entity 208 wishes to use application 210 to access resource 110 by virtue of security token 204.

Resource guard 214 receives requests to access resource 110 and effectively manages the authentication and authorization process with the other security-related components of device 102(B). Trust and authorization policy 222, as its name implies, includes policies directed to trusting entities and authorizing actions within security environment 200. Trust and authorization policy 222 may include, for example, security policy assertions (not explicitly shown in FIG. 2). Authorization query table 224 maps requested actions, such as access requests, to an appropriate authorization query. Audit policy 226 delineates audit responsibilities and audit tasks related to implementing security scheme 100 in security environment 200.

Authorization context 212 collects assertions 206 from security token 204, which is/are used to authenticate the requesting entity, and security policy assertions from trust and authorization policy 222. These collected assertions in authorization context 212 form an assertion context. Hence, authorization context 212 may include other information in addition to the various assertions.

The assertion context from authorization context 212 and an authorization query from authorization query table 224 are provided to authorization engine 218. Using the assertion context and the authorization query, authorization engine 218 makes an authorization decision. Resource guard 214 responds to the access request based on the authorization decision. Audit log 216 contains audit information such as, for example, identification of the requested resource 110 and/or the algorithmic evaluation logic performed by authorization engine 218.

Figure 3:
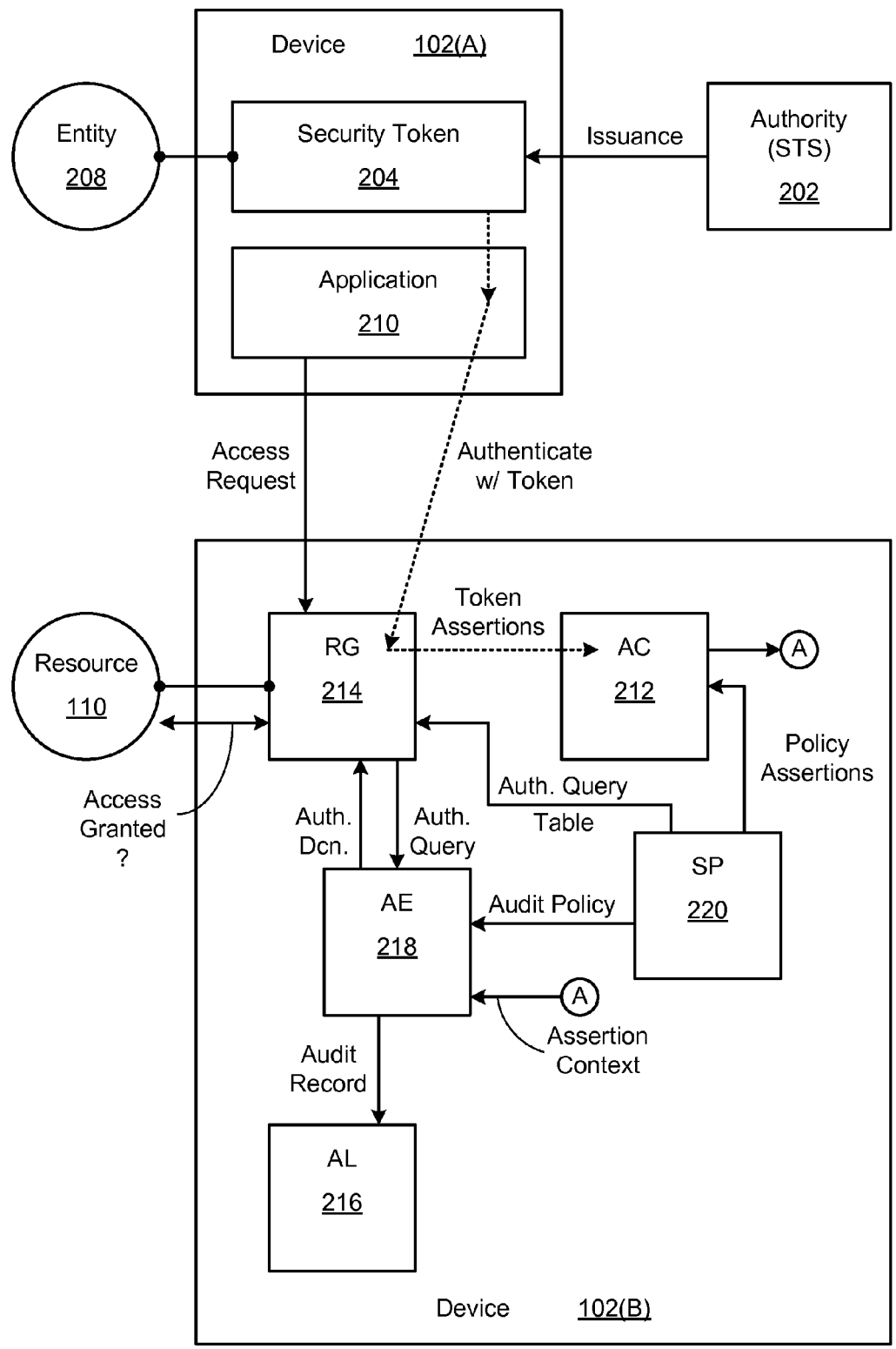
FIG. 3 is a block diagram illustrating the example security environment of FIG. 2 in which example security-related data is exchanged among the security-related components.

FIG. 3 is a block diagram illustrating example security environment 200 in which example security-related data is exchanged among the security-related components. The security-related data is exchanged in support of an example access request operation. In this example access request operation, entity 208 wishes to access resource 110 using application 210 and indicates its authorization to do so with security token 204. Hence, application 210 sends an access request* to resource guard 214. In this description of FIG. 3, an asterisk (i.e., "*") indicates that the stated security-related data is explicitly indicated in FIG. 3.

In a described implementation, entity 208 authenticates* itself to resource guard 214 with a token*, security token 204. Resource guard 214 forwards the token assertions* to authorization context 212. These token assertions are assertions 206 (of FIG. 2) of security token 204. Security policy 220 provides the authorization query table* to resource guard 214. The authorization query table derives from authorization query table module 224. The authorization query table sent to resource guard 214 may be confined to the portion or portions directly related to the current access request.

Policy assertions are extracted from trust and authorization policy 222 by security policy 220. The policy assertions may include both trust-related assertions and authorization-related assertions. Security policy 220 forwards the policy assertions* to authorization context 212. Authorization context 212 combines the token assertions and the policy assertions into an assertion context. The assertion context* is provided from authorization context 212 to authorization engine 218 as indicated by the encircled "A".

An authorization query is ascertained from the authorization query table. Resource guard 214 provides the authorization query (auth. query*) to authorization engine 218. Authorization engine 218 uses the authorization query and the assertion context in an evaluation algorithm to produce an authorization decision. The authorization decision (auth. dcn.*) is returned to resource guard 214. Whether entity 208 is granted access* to resource 110 by resource guard 214 is dependent on the authorization decision. If the authorization decision is affirmative, then access is granted. If, on the other hand, the authorization decision issued by authorization engine 218 is negative, then resource guard 214 does not grant entity 208 access to resource 110.

The authorization process can also be audited using semantics that are complementary to the authorization process. The auditing may entail monitoring of the authorization process and/or the storage of any intermediate and/or final products of, e.g., the evaluation algorithm logically performed by authorization engine 218. To that end, security policy 220 provides to authorization engine 218 an audit policy* from audit policy 226. At least when auditing is requested, an audit record* having audit information may be forwarded from authorization engine 218 to audit log 216. Alternatively, audit information may be routed to audit log 216 via resource guard 214, for example, as part of the authorization decision or separately.

Figure 4:
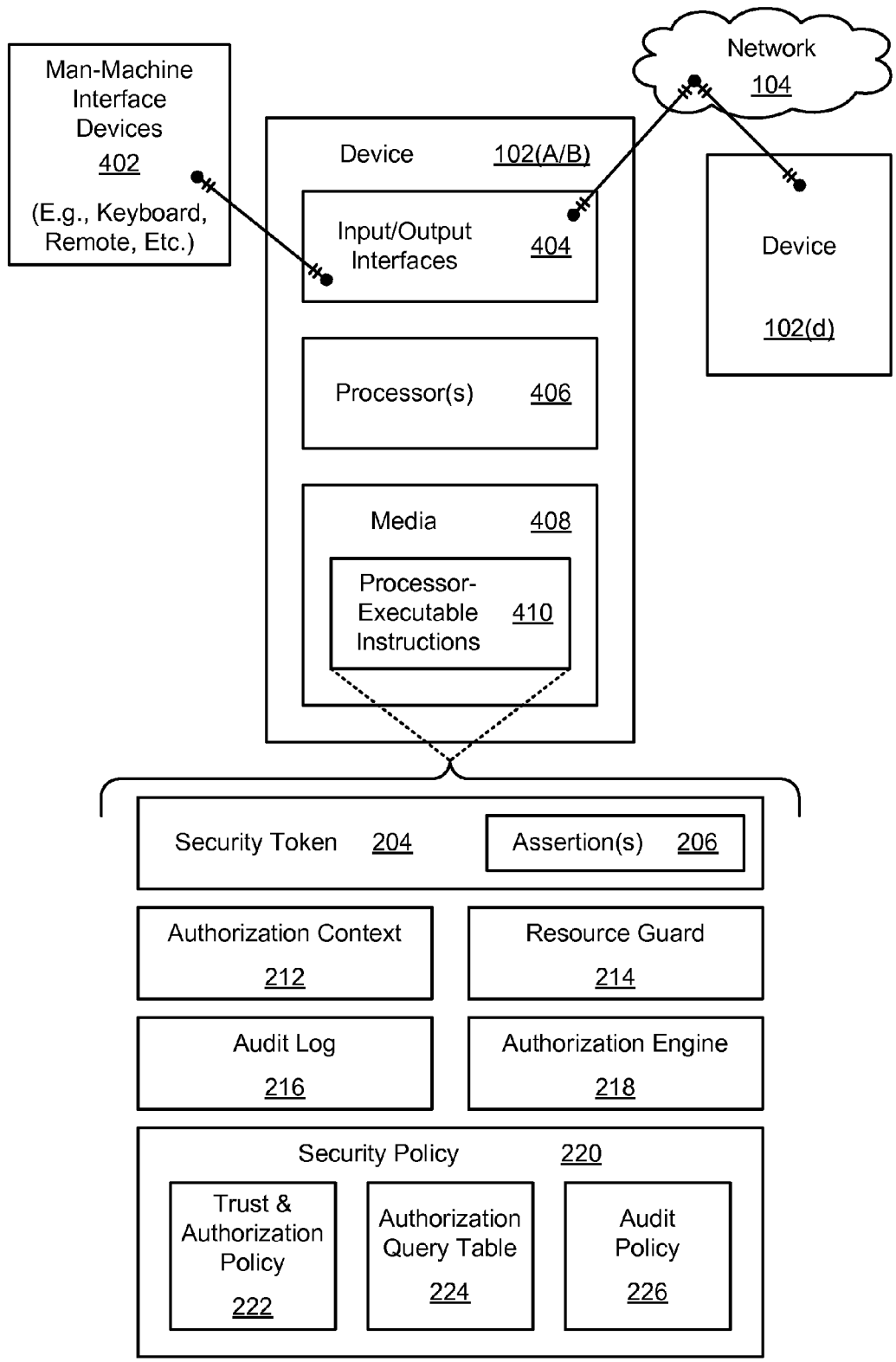
FIG. 4 is a block diagram of an example device that may be used for security-related implementations as described herein.

FIG. 4 is a block diagram of an example device 102 that may be used for security-related implementations as described herein. Multiple devices 102 are capable of communicating across one or more networks 104. As illustrated, two devices 102(A/B) and 102(d) are capable of engaging in communication exchanges via network 104. Although two devices 102 are specifically shown, one or more than two devices 102 may be employed, depending on the implementation.

Generally, a device 102 may represent any computer or processing-capable device, such as a client or server device; a workstation or other general computer device; a PDA; a mobile phone; a gaming platform; an entertainment device; one of the devices listed above with reference to FIG. 1; some combination thereof; and so forth. As illustrated, device 102 includes one or more input/output (I/O) interfaces 404, at least one processor 406, and one or more media 408. Media 408 include processor-executable instructions 410.

In a described implementation of device 102, I/O interfaces 404 may include (i) a network interface for communicating across network 104, (ii) a display device interface for displaying information on a display screen, (iii) one or more man-machine interfaces, and so forth. Examples of (i) network interfaces include a network card, a modem, one or more ports, and so forth. Examples of (ii) display device interfaces include a graphics driver, a graphics card, a hardware or software driver for a screen or monitor, and so forth. Printing device interfaces may similarly be included as part of I/O interfaces 404. Examples of (iii) man-machine interfaces include those that communicate by wire or wirelessly to man-machine interface devices 402 (e.g., a keyboard, a remote, a mouse or other graphical pointing device, etc.).

Generally, processor 406 is capable of executing, performing, and/or otherwise effectuating processor-executable instructions, such as processor-executable instructions 410. Media 408 is comprised of one or more processor-accessible media. In other words, media 408 may include processor-executable instructions 410 that are executable by processor 406 to effectuate the performance of functions by device 102.

Thus, realizations for security-related implementations may be described in the general context of processor-executable instructions. Generally, processor-executable instructions include routines, programs, applications, coding, modules, protocols, objects, components, metadata and definitions thereof, data structures, application programming interfaces (APIs), schema, etc. that perform and/or enable particular tasks and/or implement particular abstract data types. Processor-executable instructions may be located in separate storage media, executed by different processors, and/or propagated over or extant on various transmission media.

Processor(s) 406 may be implemented using any applicable processing-capable technology. Media 408 may be any available media that is included as part of and/or accessible by device 102. It includes volatile and non-volatile media, removable and non-removable media, and storage and transmission media (e.g., wireless or wired communication channels). For example, media 408 may include an array of disks/flash memory/optical media for longer-term mass storage of processor-executable instructions 410, random access memory (RAM) for shorter-term storing of instructions that are currently being executed, link(s) on network 104 for transmitting communications (e.g., security-related data), and so forth.

As specifically illustrated, media 408 comprises at least processor-executable instructions 410. Generally, processor-executable instructions 410, when executed by processor 406, enable device 102 to perform the various functions described herein, including those actions that are illustrated in the various flow diagrams. By way of example only, processor-executable instructions 410 may include a security token 204, at least one of its assertions 206, an authorization context module 212, a resource guard 214, an audit log 216, an authorization engine 218, a security policy 220 (e.g., a trust and authorization policy 222, an authorization query table 224, and/or an audit policy 226, etc.), some combination thereof, and so forth. Although not explicitly shown in FIG. 4, processor-executable instructions 410 may also include an application 210 and/or a resource 110.

Security Policy Assertion Language Example Characteristics

This section describes example characteristics of an implementation of a security policy assertion language (SecPAL). The SecPAL implementation of this section is described in a relatively informal manner and by way of example only. It has an ability to address a wide spectrum of security policy and security token obligations involved in creating an end-to-end solution. These security policy and security token obligations include, by way of example but not limitation: describing explicit trust relationships; expressing security token issuance policies; providing security tokens containing identities, attributes, capabilities, and/or delegation policies; expressing resource authorization and delegation policies; and so forth.

In a described implementation, SecPAL is a declarative, logic-based language for expressing security in a flexible and tractable manner. It can be comprehensive, and it can provide a uniform mechanism for expressing trust relationships, authorization policies, delegation policies, identity and attribute assertions, capability assertions, revocations, audit requirements, and so forth. This uniformity provides tangible benefits in terms of making the security scheme understandable and analyzable. The uniform mechanism also improves security assurance by allowing one to avoid, or at least significantly curtail, the need for semantic translation and reconciliation between disparate security technologies.

A SecPAL implementation may include any of the following example features: [1] SecPAL can be relatively easy to understand. It may use a definitional syntax that allows its assertions to be read as English-language sentences. Also, its grammar may be restrictive such that it requires users to understand only a few subject-verb-object (e.g., subject-verb phrase) constructs with cleanly defined semantics. Finally, the algorithm for evaluating the deducible facts based on a collection of assertions may rely on a small number of relatively simple rules.

[2] SecPAL can leverage industry standard infrastructure in its implementation to ease its adoption and integration into existing systems. For example, an extensible markup language (XML) syntax may be used that is a straightforward mapping from the formal model. This enables use of standard parsers and syntactic correctness validation tools. It also allows use of the W3C XML Digital Signature and Encryption standards for integrity, proof of origin, and confidentiality.

[3] SecPAL may enable distributed policy management by supporting distributed policy authoring and composition. This allows flexible adaptation to different operational models governing where policies, or portions of policies, are authored based on assigned administrative duties. Use of standard approaches to digitally signing and encrypting policy objects allow for their secure distribution. [4] SecPAL enables an efficient and safe evaluation. Simple syntactic checks on the inputs are sufficient to ensure evaluations will terminate and produce correct answers.

[5] SecPAL can provide a complete solution for access control requirements supporting required policies, authorization decisions, auditing, and a public-key infrastructure (PKI) for identity management. In contrast, most other approaches only manage to focus on and address one subset of the spectrum of security issues. [6] SecPAL may be sufficiently expressive for a number of purposes, including, but not limited to, handling the security issues for Grid environments and other types of distributed systems. Extensibility is enabled in ways that maintain the language semantics and evaluation properties while allowing adaptation to the needs of specific systems.

Figure 5:
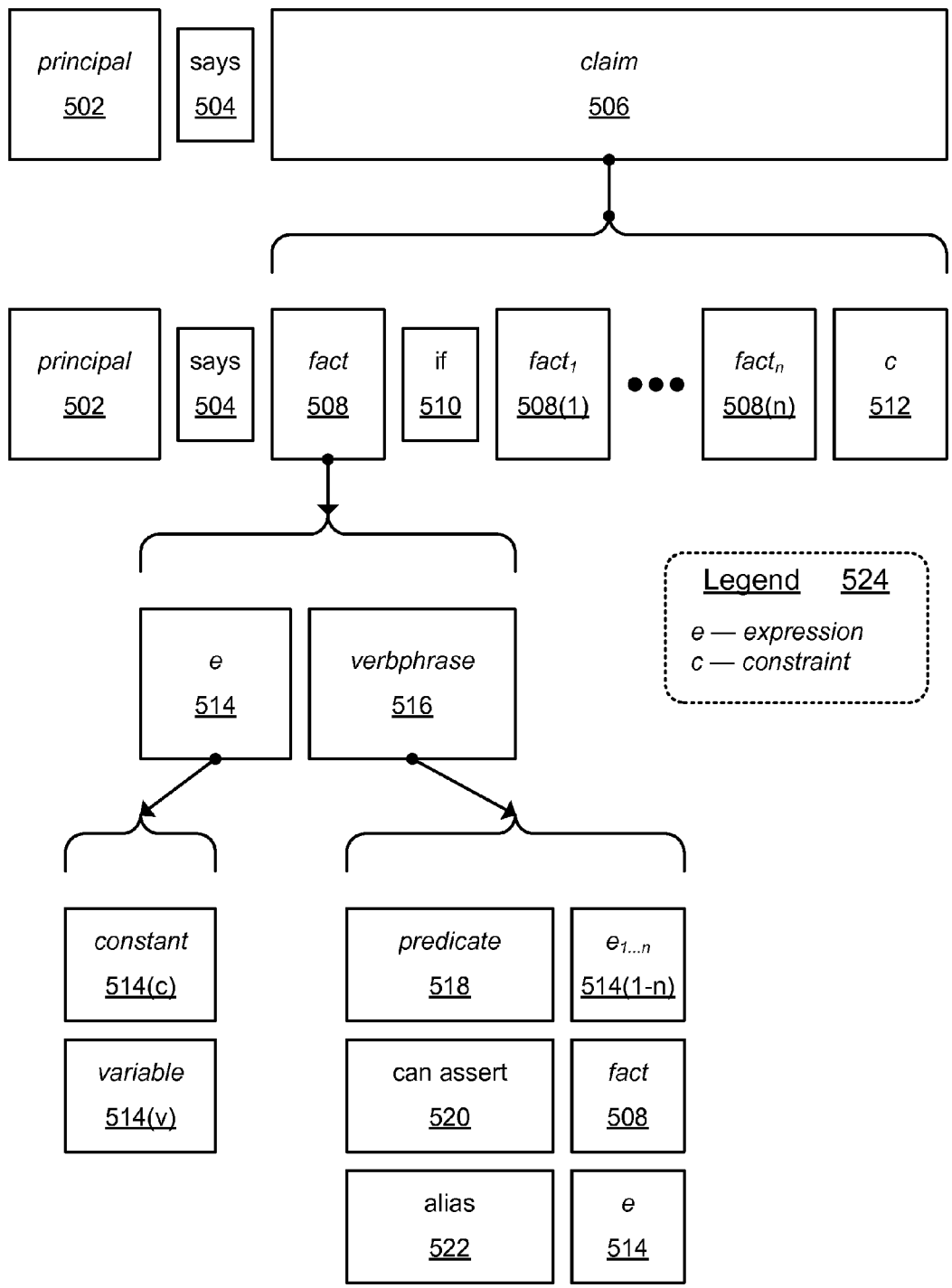
FIG. 5 is a block diagram illustrating an example assertion format for a general security scheme.

FIG. 5 is a block diagram illustrating an example assertion format 500 for a general security scheme. Security scheme assertions that are used in the implementations described otherwise herein may differ from example assertion format 500. However, assertion format 500 is a basic illustration of one example format for security scheme assertions, and it provides a basis for understanding example described implementation of various aspects of a general security scheme.

As illustrated at the top row of assertion format 500, an example assertion at a broad level includes: a principal portion 502, a says portion 504, and a claim portion 506. Textually, the broad level of assertion format 500 may be represented by: principal says claim.

At the next row of assertion format 500, claim portion 506 is separated into example constituent parts. Hence, an example claim portion 506 includes: a fact portion 508, an if portion 510, "n" conditional $fact_{1 \ldots n}$ portions 508(1 ... n), and a c portion 512. The subscript "n" represents some integer value. As indicated by legend 524, c portion 512 represents a constraint portion. Although only a single constraint is illustrated, c portion 512 may actually represent multiple constraints (e.g., $c_1, \ldots, c_m$). The set of conditional fact portions 508(1 ... n) and constraints 512(1 ... m) on the right-hand side of if portion 510 may be termed the antecedent.

Textually, claim portion 506 may be represented by: fact if $fact_1, \ldots, fact_n$, c. Hence, the overall assertion format 500 may be represented textually as follows: principal says fact if $fact_1, \ldots, fact_n$, c. However, an assertion may be as simple as: principal says fact. In this abbreviated, three-part version of an assertion, the conditional portion that starts with if portion 510 and extends to c portion 512 is omitted.

Each fact portion 508 may also be further subdivided into its constituent parts. Example constituent parts are: an e portion 514 and a verb phrase portion 516. As indicated by legend 524, e portion 514 represents an expression portion. Textually, a fact portion 508 may be represented by: e verbphrase.

Each e or expression portion 514 may take on one of two example options. These two example expression options are: a constant 514(c) and a variable 514(v). Principals may fall under constants 514(c) and/or variables 514(v).

Each verb phrase portion 516 may also take on one of three example options. These three example verb phrase options are: a predicate portion 518 followed by one or more $e_{1 \ldots n}$ portions 514(1 ... n), a can assert portion 520 followed by a fact portion 508, and an alias portion 522 followed by an expression portion 514. Textually, these three verb phrase options may be represented by: predicate $e_1 \ldots e_n$, can assert fact, and alias e, respectively. The integer "n" may take different values for facts 508(1 ... n) and expressions 514(1 ... n).

Generally, SecPAL statements are in the form of assertions made by a security principal. Security principals are typically identified by cryptographic keys so that they can be authenticated across system boundaries. In their simplest form, an assertion states that the principal believes a fact is valid (e.g., as represented by a claim 506 that includes a fact portion 508). They may also state a fact is valid if one or more other facts are valid and some set of conditions are satisfied (e.g., as represented by a claim 506 that extends from a fact portion 508 to an if portion 510 to conditional fact portions 508(1 ... n) to a c portion 512). There may also be conditional facts 508(1 ... n) without any constraints 512 and/or constraints 512 without any conditional facts 508(1 ... n).

In a described implementation, facts are statements about a principal. Four example types of fact statements are described here in this section. First, a fact can state that a principal has the right to exercise an action(s) on a resource with an "action verb". Example action verbs include, but are not limited to, call, send, read, list, execute, write, modify, append, delete, install, own, and so forth. Resources may be identified by universal resource indicators (URIs) or any other approach.

Second, a fact can express the binding between a principal identifier and one or more attribute(s) using the "possess" verb. Example attributes include, but are not limited to, email name, common name, group name, role title, account name, domain name server/service (DNS) name, internet protocol (IP) address, device name, application name, organization name, service name, account identification/identifier (ID), and so forth. An example third type of fact is that two principal identifiers can be defined to represent the same principal using the "alias" verb.

"Qualifiers" or fact qualifiers may be included as part of any of the above three fact types. Qualifiers enable an assertor to indicate environmental parameters (e.g., time, principal location, etc.) that it believes should hold if the fact is to be considered valid. Such statements may be cleanly separated between the assertor and a relying party's validity checks based on these qualifier values.

An example fourth type of fact is defined by the "can assert" verb. This "can assert" verb provides a flexible and powerful mechanism for expressing trust relationships and delegations. For example, it allows one principal (A) to state its willingness to believe certain types of facts asserted by a second principal (B). For instance, given the assertions "A says B can assert fact0" and "B says fact0", it can be concluded that A believes fact0 to be valid and therefore it can be deduced that "A says fact0".

Such trust and delegation assertions may be (i) unbounded and transitive to permit downstream delegation or (ii) bounded to preclude downstream delegation. Although qualifiers can be applied to "can assert" type facts, omitting support for qualifiers to these "can assert" type facts can significantly simplify the semantics and evaluation safety properties of a given security scheme.

In a described implementation, concrete facts can be stated, or policy expressions may be written using variables. The variables are typed and may either be unrestricted (e.g., allowed to match any concrete value of the correct type) or restricted (e.g., required to match a subset of concrete values based on a specified pattern).

Security authorization decisions are based on an evaluation algorithm (e.g., that may be conducted at authorization engine 218) of an authorization query against a collection of assertions (e.g., an assertion context) from applicable security policies (e.g., a security policy 220) and security tokens (e.g., one or more security tokens 204). Authorization queries are logical expressions, which may become quite complex, that combine facts and/or conditions. These logical expressions may include, for example, AND, OR, and/or NOT logical operations on facts, either with or without attendant conditions and/or constraints.

This approach to authorization queries provides a flexible mechanism for defining what must be known and valid before a given action is authorized. Query templates (e.g., from authorization query table 224) form a part of the overall security scheme and allow the appropriate authorization query to be declaratively stated for different types of access requests and other operations/actions.

Example Implementations for Auditing Authorization Decisions

Auditing is desirable in modern computing systems, including distributed systems. Distributed systems in particular usually involve complex interactions between multiple entities. They also have many potential failure points. Auditing provides a mechanism for collecting information about those interactions so that one can later review authorized interactions, attempts to engage in unauthorized interactions, malicious attacks against the system, combinations thereof, and so forth.

With existing auditing approaches, a deficiency is that they are designed and implemented independently from access control policies. In fact, existing approaches to access control policy such as ACLs, XACML, REL, etc. fail to define any way to specify audit behaviors. Furthermore, they do not address what information is to be logged.

The result is that conventional, ad hoc audit systems define their own policy mechanism. This is typically based solely on the end result of some authorization decision. There is therefore little if any interface or insight into the specifics of the authorization decision process, which limits the granularity of the audit collection.

Similarly, how audit information is to be collected is specified independently from the access control policy. This has two negative impacts: First, the audit system is unaware of all the information that is actually used in reaching the authorization decision and may therefore not accurately collect it. Second, the audit information is independent of the authentication and authorization process. It therefore requires semantic translation, with an attendant possible loss of information, from the authenticated data and policies that are input into the authorization decision process.

In contrast, certain implementations as described herein address these problems by coupling access control mechanisms and audit mechanisms based on the same semantics. More specifically, a described auditing scheme enables the specification of an audit policy, including audit triggers and collected audit content, in a manner that is integrated with an access control scheme by utilizing the same or similar semantics.

In an example implementation, a security authorization paradigm provides a mechanism for specifying an audit policy that is tightly coupled to an access control policy. First, it enables audit instructions to be expressed in a manner that reflects the scope of the access control policy. For example, the audit instructions can be expressed in terms of resources, the access rights to those resources, and so forth. Second, it enables the specification of what information is to be logged in terms of, for example, the authenticated inputs, the input trust and authorization policy, the internal logical deductions upon which an authorization decision is based, and so forth.

Figure 6:
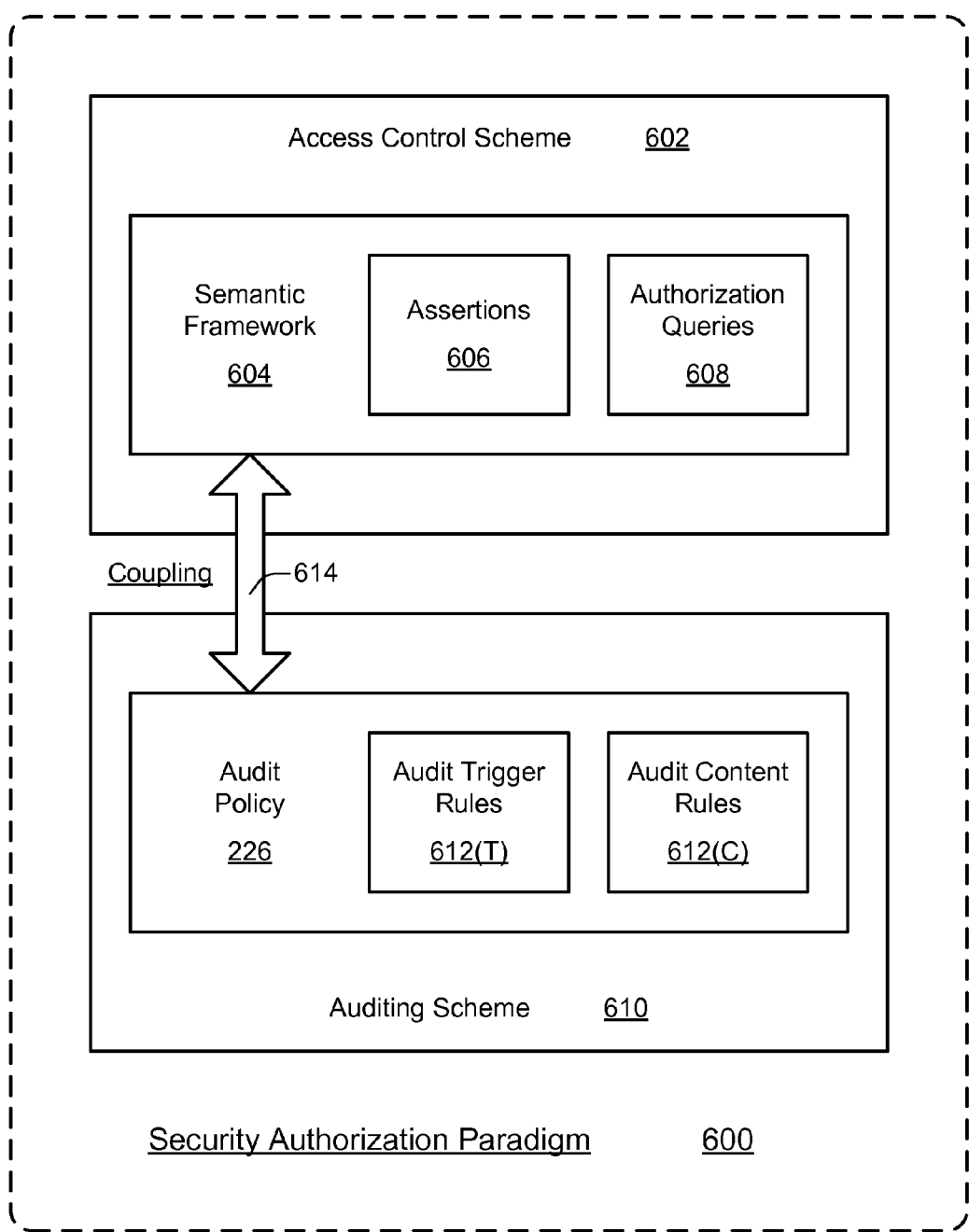
FIG. 6 is a block diagram illustrating an example security authorization paradigm including an access control scheme and an auditing scheme having audit policy rules.

FIG. 6 is a block diagram illustrating an example security authorization paradigm 600 including an access control scheme 602 and an auditing scheme 610 having audit policy rules 612. As illustrated, access control scheme 602 includes a semantic framework 604. Semantic framework 604 includes assertions 606 and authorization queries 608. Auditing scheme 610 includes audit policy 226 (of FIG. 2). Audit policy 226 includes audit policy rules 612, which include audit trigger rules 612(T) and audit content rules 612(C).

In a described implementation, auditing scheme 610 is integrated with access control scheme 602 via a coupling between them at the semantic level. More specifically, audit policy 226 is coupled to semantic framework 604 as indicated by coupling arrow 614.

Semantic framework 604 represents the semantics of an access control scheme and/or language, such as the implementations described herein above. Accordingly, semantic framework 604 includes at least assertions 606 and authorization queries 608. Although not explicitly shown in FIG. 6, semantic framework 604 may include other aspects beyond the illustrated two, such as resource names, potential actions, resource-specific operations, and so forth.

Assertions 606 may be token assertions, policy assertions, and so forth. They can form the basis of security tokens (e.g., security token 204 of FIGS. 2 and 3), trust and authorization policies (e.g., trust and authorization policy 222), and so forth. Authorization queries 608 may be authorization queries that indicate when, how, to what extent, etc. a resource may be accessed if certain matching authenticated assertions are valid. They can be located in a query table (e.g., authorization query table 224).

Audit policy 226 specifies auditing instructions using the same semantic as semantic framework 604. These auditing instructions are referred to generally as audit policy rules 612. Accordingly, audit trigger rules 612(T) and audit content rules 612(C) both utilize, at least in part, the same semantic as semantic framework 604. More generally, the semantics of audit policy rules 612 may be considered to comport with semantic framework 604 of access control scheme 602.

Although not explicitly shown in FIG. 6, audit policy 226 may include other audit rule types beyond the illustrated two.

Audit trigger rules 612(T) are rules that specify when an audit record should be generated; they utilize a semantic that comports with semantic framework 604 of access control scheme 602. In other words, audit trigger rules 612(T) are rules that trigger auditing. Audit content rules 612(C) are rules that specify what audit information should be included in an audit record. Audit content rules 612(C) make this specification utilizing semantic framework 604. Additionally, the resulting generated audit record is returned with audit information that also comports with semantic framework 604.

Figure 7:
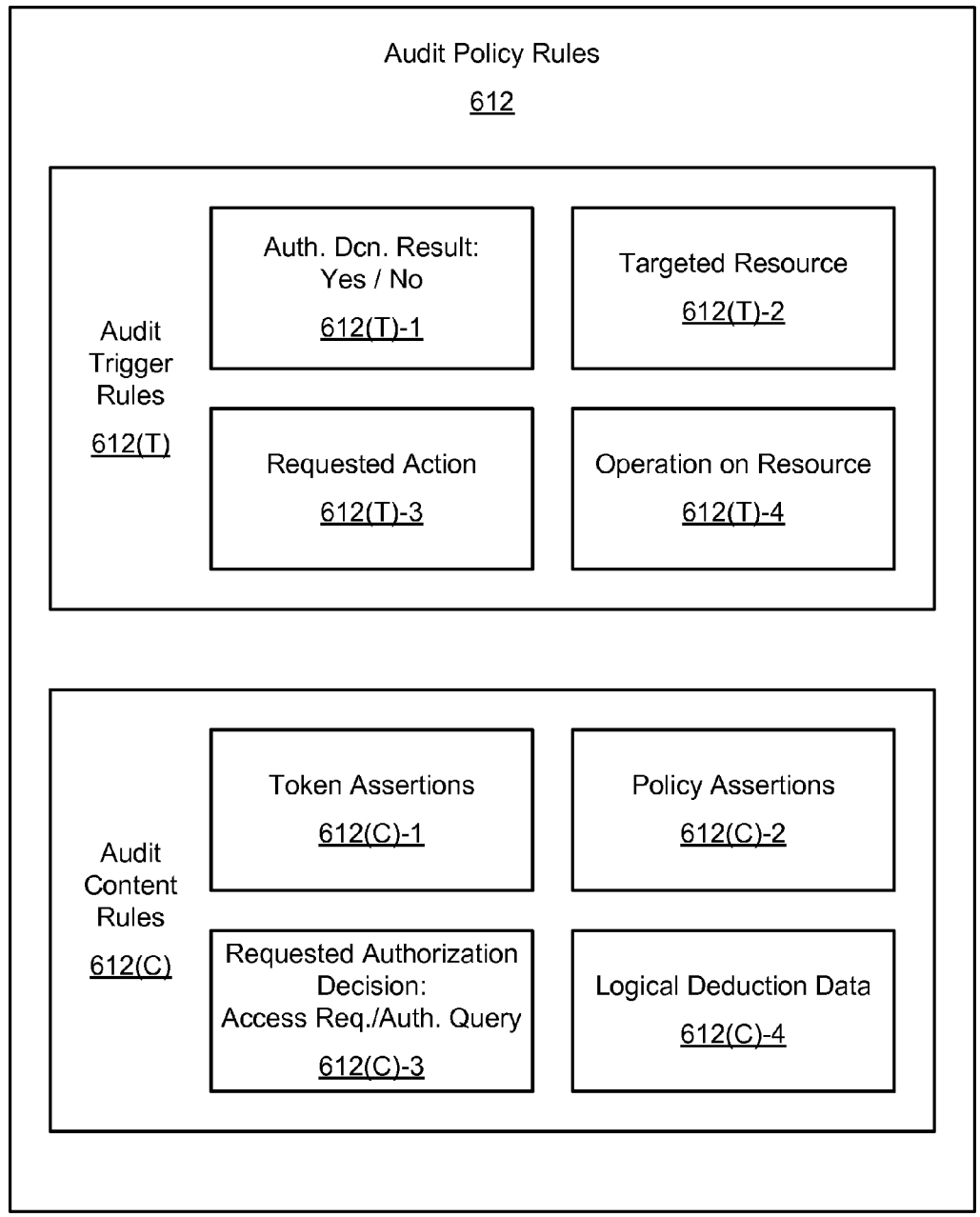
FIG. 7 is a block diagram illustrating example audit policy rules for an auditing scheme.

FIG. 7 is a block diagram illustrating example audit policy rules 612 for an auditing scheme, such as auditing scheme 610 (of FIG. 6). As illustrated, audit policy rules 612 include audit trigger rules 612(T) and audit content rules 612(C). Audit trigger rules 612(T) include authorization decision result 612(T)-1, targeted resource 612(T)-2, requested action 612(T)-3, and operation on resource 612(T)-4. Audit content rules 612(C) include token assertions 612(C)-1, policy assertions 612(C)-2, requested authorization decision 612(C)-3, and logical deduction data 612(C)-4. Each of audit trigger rules 612(T) and audit content rules 612(C) may include additional rules than the illustrated four apiece.

Authorization decision result 612(T)-1 is a rule that specifies that auditing is to be triggered when a particular authorization decision is made. The authorization decision may be yes, no, some other specialized decision, and so forth. For instance, auditing may be triggered each time an access request is denied, but not necessarily when an access request is granted. Targeted resource 612(T)-2 is a rule that specifies that auditing is to be triggered when a particular resource is targeted for access by an access request. For instance, a particular resource may be especially important, so access requests to it are instructed to trigger an audit regardless of any other relatively-innocuous parameters of the access request. To comport with semantic framework 604, the targeted resource is specified in the same manner (e.g., with an identical naming mechanism) as how it is specified in access control scheme 602.

Requested action 612(T)-3 is a rule that specifies that auditing is to be triggered when a particular action is requested. For instance, all write requests or all attempts to execute a program may be set to trigger an audit because they are considered especially risky or dangerous. To comport with semantic framework 604, the requested action is specified in the same manner as how it is specified in access control scheme 602. Operation on resource 612(T)-4 is a rule that specifies that auditing is to be triggered when a particular operation is requested on a particular resource. For instance, auditing may be set to be triggered whenever a risky operation is requested to be performed on an especially important or vulnerable resource. To comport with semantic framework 604, the resource-specific operation is specified in the same manner as how it is specified in access control scheme 602.

These four or any other trigger mechanisms enable an author of an audit policy 226 to specify when audit information is recorded. They may also be combined in any manner. For example, authorization decision result trigger 612(T)-1 may be combined with any of the other three illustrated audit triggers to specify flexible auditing rules that are responsive to whether or not a particular access request is or is not authorized.

An author of an audit policy 226 can specify what audit information is included in an audit record using audit content rules 612(C). The returned audit information comports with semantic framework 604 by being, for example, any of the same information that is used as part of access control scheme 602. The capability to specify the audit information to be logged may be accomplished by referencing specific types of information used in making an access control decision.

Hence, audit content rules 612(C) may specify token (e.g., authenticated) assertions 612(C)-1 and/or policy assertions 612(C)-2. Audit content rules 612(C) may also specify requested authorization decision 612(C)-3. For example, the incoming access request and/or the corresponding authorization query used in the logical evaluation may be returned as part of the audit information.

Audit content rules 612(C) may also specify that logical deduction data 612(C)-4 is to be included in the returned logical deduction data. Logical deduction data is the data operated on and produced when performing a logical evaluation, including a logical evaluation algorithm of an authorization engine 218 (of FIG. 2). It can include initial and intermediate logical deduction data as well as final logical deduction data. It can also indicate logical deduction paths or links in a logical chain of deductions that lead to an authorization decision result. An example of logical deduction data is described herein below with reference to FIG. 10.

The audit information specified by audit content rules 612(C) may be supplemented with a fixed set of general information about the decision environment. Examples of such general information include, but are not limited to, the date and time a decision is made, a device where the decision is made, an application identity of the decision enforcer, and so forth. To ensure administrators are alerted to critical security events, an additional communication mechanism may be implemented. This communication-related mechanism is for indicating where audit events are to be logged and/or whether they are to generate events that administrators may subscribe to.

Figure 8:
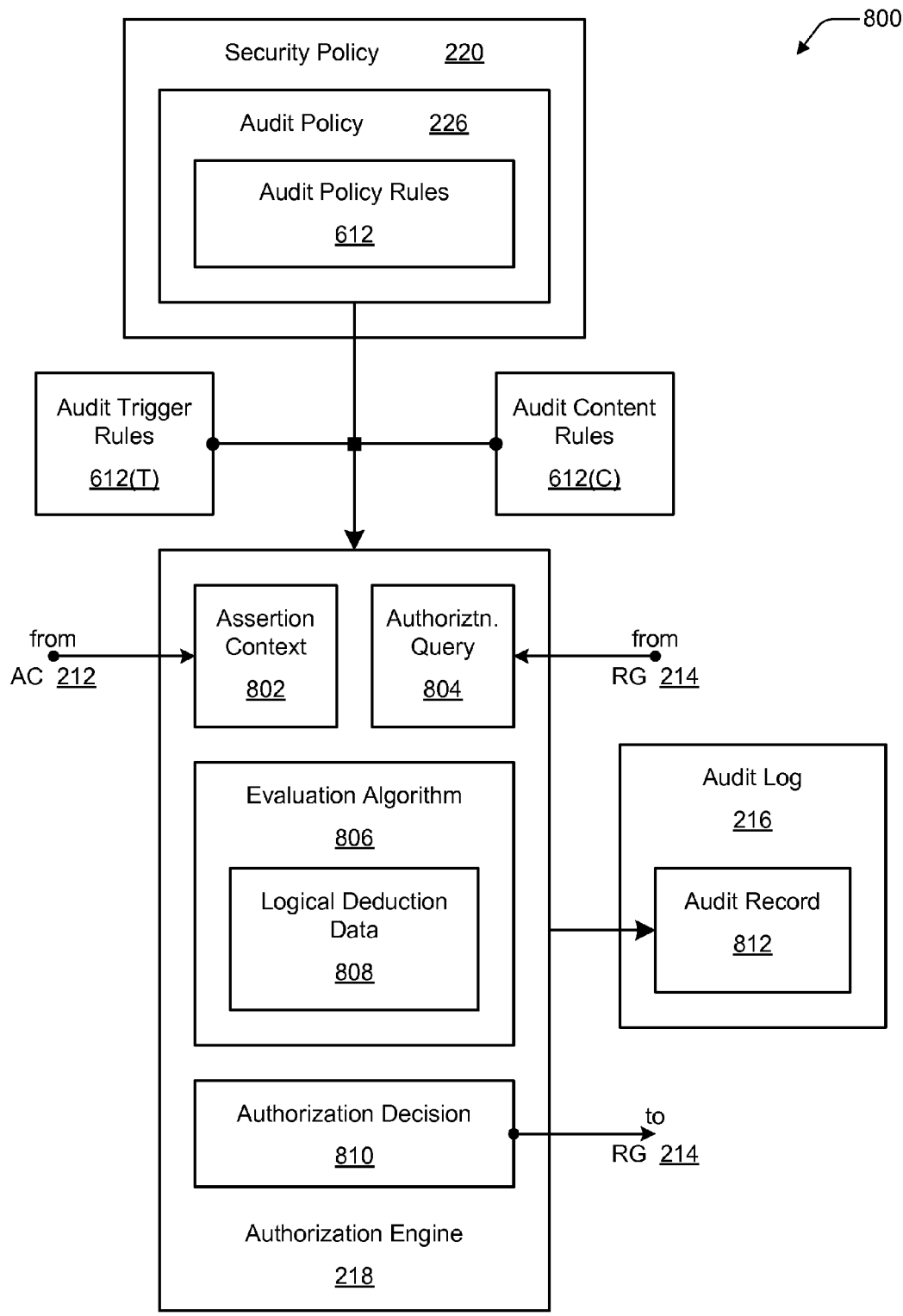
FIG. 8 is a block diagram illustrating an example of an auditing scheme that is integrated with an access control scheme having an evaluation algorithm that makes authorization decisions.

FIG. 8 is a block diagram 800 illustrating an example of an auditing scheme that is integrated with an access control scheme having an evaluation algorithm 806 that makes authorization decisions 810. As illustrated, block diagram 800 includes a security policy 220, an authorization engine 218, and an audit log 216. Security policy 220, authorization engine 218, and audit log 216 are described generally herein above with particular reference to FIGS. 2 and 3.

In a described implementation, security policy 220 includes audit policy 226 and audit policy rules 612. Security policy module 220 provides audit policy rules 612 to authorization engine 218. As shown, audit policy rules 612 can include one or more audit trigger rules 612(T) and/or one or more audit content rules 612(C).

Authorization engine 218 includes assertion context 802, authorization query 804, evaluation algorithm 806, and authorization decision 810. With reference also to FIG. 3, authorization engine 218 receives assertion context 802 from authorization context 212. Assertion context 802 may include token assertions and/or policy assertions. Additionally, authorization engine 218 receives authorization query 804 from resource guard 214. Authorization query 804 is extracted from authorization query table 224 responsive to an access request (e.g., after being translated into a resource-specific operation).

Evaluation algorithm 806 performs a logical evaluation or analysis on authorization query 804 in conjunction with assertion context 802. Inputs to evaluation algorithm 806 thus include assertion context 802 and authorization query 804. During the logical analysis, evaluation algorithm 806 produces logical deduction data 808. Logical deduction data 808 can include original assertions, intermediate deductive assertions (e.g., deductions), final deductions, and so forth.

Evaluation algorithm 806 produces a TRUE or FALSE result (e.g., optionally represented as a set of variables satisfying the logical analysis on authorization query 804). The result is converted to an authorization decision 810 that indicates whether the requested access should be granted or denied. Authorization decision 810 is output from authorization engine 218 and forwarded to resource guard 214.

In accordance with audit policy rules 612, authorization engine 218 generates an audit record 812 and forwards audit record 812 to audit log 216. Audit record 812 is generated responsive to detection of any audit triggers specified in audit trigger rules 612(T). The audit information included in audit record 812 is based on audit content rules 612(C). The audit information may be recorded constantly and provided as audit record 812 only when a trigger is detected, or audit information may only be recorded when a trigger is detected.

Figure 9:
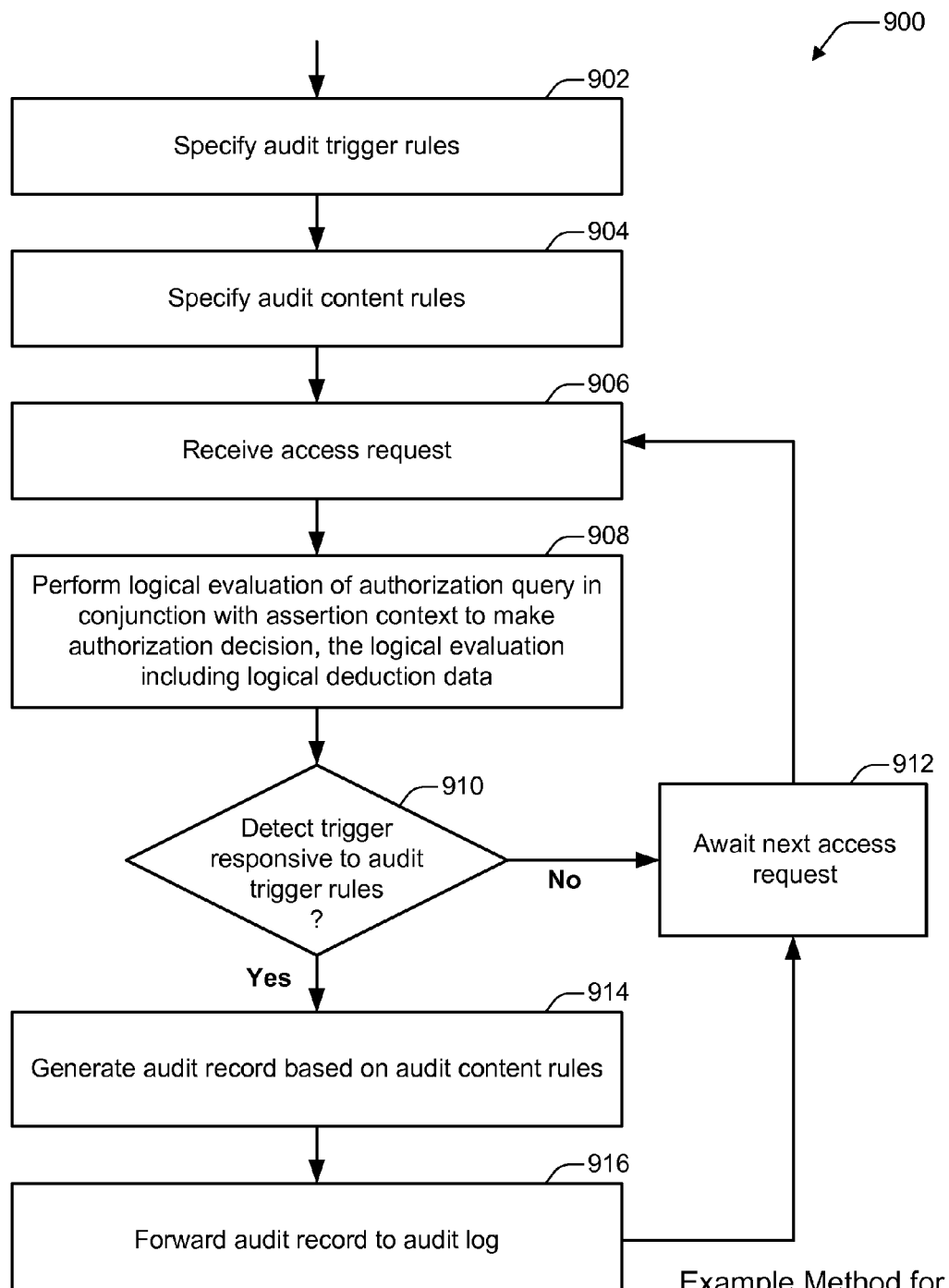
FIG. 9 is a flow diagram that illustrates an example of a method for integrating an audit process with an access control process.

FIG. 9 is a flow diagram 900 that illustrates an example of a method for integrating an audit process with an access control process. Flow diagram 900 includes eight (8) blocks 902-916. Although the actions of flow diagram 900 may be performed in other environments and with a variety of hardware/software/firmware combinations, some of the features, components, and aspects of FIGS. 1-8 are used to illustrate an example of the method. For example, the actions may be performed by security policy module 220, authorization engine 218, resource guard 214, and so forth.

In a described implementation, at block 902, audit trigger rules are specified. For example, audit trigger rules 612(T) may be accepted from a user as part of an audit policy 226 of security policy 220 and provided to authorization engine 218. At block 904, audit content rules are specified. For example, audit content rules 612(C) may be accepted from a user as part of an audit policy 226 of security policy 220 and provided to authorization engine 218.

At block 906, an access request is received. For example, an access request from a requesting entity 208 may be received at resource guard 214. Based on this access request (including an identified targeted resource), any authenticated assertions, and/or a local trust and authorization policy 222, an assertion context 802 and an authorization query 804 are provided to authorization engine 218.

At block 908, a logical evaluation of an authorization query is performed in conjunction with an assertion context to derive an authorization decision. The logical evaluation produces or otherwise includes logical deduction data. For example, an evaluation algorithm 806 of authorization engine 218 may perform a logical evaluation of authorization query 804 in conjunction with assertion context 802 to derive authorization decision 810. The logical evaluation may include logical deduction data 808, which can include input assertion(s), intermediate deduction(s), and final deduction(s).

At block 910, it is determined if a trigger is detected responsive to the audit trigger rules. For example, authorization engine 218 may determine if any of audit trigger rules 612(T) are satisfied by (e.g., match) the current evaluation situation, including the access request, assertions, query, result, and so forth. If not, then a next access request is awaited at block 912.

If, on the other hand, it is determined (at block 910) that a trigger is detected, then at block 914, an audit record is generated based on the audit content rules. For example, an audit record 812 may be generated based on audit content rules 612(C). At block 916, the audit record is forwarded to an audit log. For example, audit record 812 may be forwarded from authorization engine 218 to audit log 216, where it may be reviewed by a user. Alternatively or additionally, an event may be generated that is transmitted to one or more event subscribers. The event may be confined to notification that an audit record has been generated, or it may include all or a portion of the audit record. The next access request is awaited at block 912.

Figure 10:
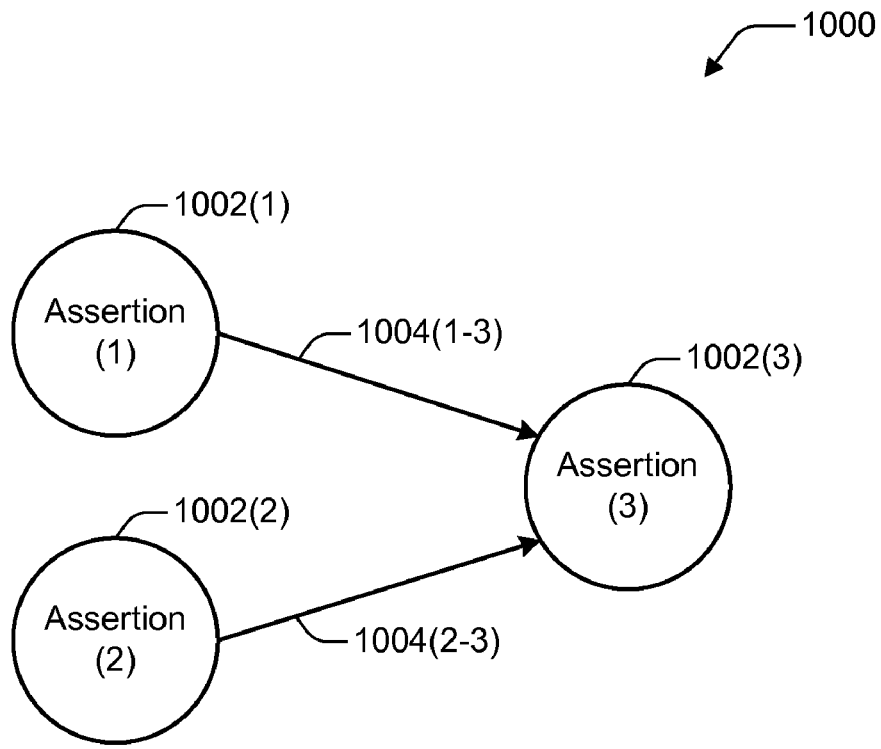
FIG. 10 is an example proof graph, which is an example of logical deduction data that is produced during an evaluation algorithm.

FIG. 10 is an example proof graph 1000, which is an example of logical deduction data 808 that is produced during an evaluation algorithm 806. As illustrated, proof graph 1000 includes three (3) nodes 1002(1), 1002(2), and 1002(3). However, a proof graph may generally include any number of nodes. Node 1002(1) represents an assertion (1). Node 1002(2) represents an assertion (2). Node 1002(3) represents an assertion (3).

A logical deduction chain is indicated, at least in part, by directed edges 1004, which represent links in the logical deduction chain. The direction of the edge indicates a dependency relationship between the nodes. Directed edge 1004(1-3) and directed edge 1004(2-3) point from node 1002(1) and from node 1002(2), respectively, to node 1002(3). Thus, directed edges 1004(1-3) and 1004(2-3) indicate that assertion (3) is deduced from assertions (1) and (2). Example assertions (1), (2), and (3) are provided below to describe the concepts behind proof graph 1000 more concretely.

In a described implementation generally, a proof graph represents the logical reasoning over an authorization context that led to an authorization decision (e.g., so as to satisfy an authorization query). The root nodes (e.g., nodes 1002(1) and 1002(2)) of the proof graph are the assertions originating from within the assertion context. Nodes are added to the graph for each deduced assertion. Nodes are connected by directed edges (e.g., directed edges 1004(1-3) and 1004(2-3)) indicating which assertions led to a deduced assertion. A node which contributes to no deductions is referred to as a terminal node. Although not shown in FIG. 10, a proof graph 1000 may also include one or more intermediate levels having at least one intermediate node apiece.

As a relatively simple example, the following assertion context containing two assertions is presented:

(1) A says B can assert x read foo.txt
(2) B says C read foo.txt.

The following authorization query is given: A says C read foo.txt. To prove this authorization query, it is noted that from assertions (1) and (2) it can be deduced that the following assertion (3) is valid:

(3) A says C read foo.txt.

The example assertions (1), (2), and (3) above may be mapped to nodes 1002(1), 1002(2), and 1002(3), respectively of proof graph 1000. If there were other assertions in the assertion context, they would not have contributed to the proof of the authorization query and would therefore not be part of the proof graph showing that the authorization query can be satisfied.

When included as part of an audit record, a proof graph may be rendered, for example, in textual form or in another serialized form allowing for compact storage or application of widely used search technology. For instance, a proof graph may be rendered as serialized XML. More specifically, a proof graph element may have one or more proof nodes, each of which corresponds to an individual assertion. These nodes jointly contain the collection of assertions that lead to the conclusion that the authorization query is satisfied.

Each node also contains a set of child proof nodes that led to the conclusion that the assertion corresponding to the node is valid. Each of those child proof nodes in turn contains the nodes used to deduce its validity, unless it represents a root node. In effect, the XML can encode the proof graph in an inverted tree structure. A tree structure facilitates identification of the assertions that prove the authorization query is satisfiable and an understanding of why those assertions are valid.

Duplication of information in a single proof graph may be reduced by referencing to a proof node that appears multiple times within the single proof graph (e.g., because a single assertion can contribute to multiple deductions). When the logical analysis of evaluation algorithm 806 is undertaken using a different format from the original semantic of the input assertions, authorization queries, etc., a conversion back to the original semantic may be performed prior to the outputting of the audit record to the audit log. This enables the semantic framework of the access control policy to be faithfully reproduced in the audit log without requiring an external translation that risks corrupting or otherwise altering the desired audit information.

The devices, actions, aspects, features, functions, procedures, modules, data structures, protocols, components, etc. of FIGS. 1-10 are illustrated in diagrams that are divided into multiple blocks. However, the order, interconnections, interrelationships, layout, etc. in which FIGS. 1-10 are described and/or shown are not intended to be construed as a limitation, and any number of the blocks can be modified, combined, rearranged, augmented, omitted, etc. in any manner to implement one or more systems, methods, devices, procedures, media, apparatuses, APIs, protocols, arrangements, etc. for auditing authorization decisions.

Although systems, media, devices, methods, procedures, apparatuses, mechanisms, schemes, approaches, processes, arrangements, and other implementations have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claims.

What is claimed is:

1. A device comprising:
   memory and a processor;
   an auditing scheme module, stored in the memory and executable on the processor; and
   an access control scheme module, stored in the memory and executable on the processor, that is integrated with the auditing scheme module, wherein
   the access control scheme module makes authorization decisions in response to access requests for resources, the authorization decisions including inputs, outputs, and internal data, and
   the auditing scheme module includes an audit policy that comprises audit policy rules, the audit policy rules including audit content rules that:
      specify what audit information from any of the inputs, the outputs, or the internal data is to be included in an audit record, and
      specify logical deduction data used or produced during evaluation algorithms of the authorization decisions, the logical deduction data comprising proof graphs indicating respective logical chains of deductions that occur within the evaluation algorithms.

2. The device as recited in claim 1, wherein the audit content rules utilize a semantic framework that is utilized by the access control scheme for making the authorization decisions.

3. The device as recited in claim 1, wherein the audit content rules further specify inputs to the authorization decisions in terms of logical assertions.

4. The device as recited in claim 3, wherein the audit content rules further specify the internal data of the authorization decisions in terms of logical deductions derived from the logical assertions.

5. The device as recited in claim 1, wherein the audit policy rules further include audit trigger rules that specify when the audit record is to be generated and added to an audit log.

6. The device as recited in claim 5, wherein the audit trigger rules further specify that the audit record is to be generated and added to the audit log responsive to access requests involving a particular authorization decision result, a particular targeted resource, a particular requested action, and/or a particular operation on a particular resource.

7. A system comprising:
   one or more processors;
   memory, communicatively coupled to the one or more processors, storing instructions that, when executed by the one or more processors, configure the one or more processors to perform acts comprising:
   receiving an access request for a resource by an access control scheme;
   performing by the access control scheme, at least partly in response to the access request, an authorization decision for the resource, the authorization decision comprising inputs, outputs, and internal data;
   specifying, by an auditing scheme, an audit policy comprising audit policy rules, the audit policy rules including audit content rules that specify what audit information from any of the inputs, the outputs, or the internal data is to be included in an audit record, and specify logical deduction data used or produced during an evaluation algorithm of the authorization decision, the logical deduction data comprising a proof graph indicating a logical chain of deductions that occur within the evaluation algorithm; and
   recording, by the auditing scheme, the audit record based at least in part on the specified audit policy.

8. The system as recited in claim 7, wherein the audit content rules utilize a semantic framework that is utilized by the access control scheme for performing the authorization decision.

9. The system as recited in claim 7, wherein the audit content rules further specify inputs to the authorization decision in terms of logical assertions.

10. The system as recited in claim 9, wherein the audit content rules further specify the internal data of the authorization decision in terms of logical deductions derived from the logical assertions.

11. The system as recited in claim 7, wherein the audit policy rules further include audit trigger rules that specify when the audit record is to be generated and added to an audit log.

12. The system as recited in claim 11, wherein the audit trigger rules further specify that the audit record is to be generated and added to the audit log responsive to access requests involving a particular authorization decision result, a particular targeted resource, a particular requested action, and/or a particular operation on a particular resource.

13. A computer-implemented method comprising:
   one or more processors executing following computer-readable instructions:
   receiving an access request for a resource;

performing, at least partly in response to the access request, an authorization decision for the resource, the authorization decision comprising inputs, outputs, and internal data;

specifying, an audit policy comprising audit policy rules, the audit policy rules including audit content rules that specify what audit information from any of the inputs, the outputs, or the internal data is to be included in an audit record and specify logical deduction data used or produced during an evaluation algorithm of the authorization decision, wherein the logical deduction data comprises a proof graph indicating a logical chain of deductions that occur within the evaluation algorithm, and the audit content rules comprise a semantic framework; and recording the audit record based at least in part on the specified audit policy.

14. The computer-implemented method as recited in claim 13, wherein the audit content rules specify inputs to the authorization decision in terms of logical assertions and internal data of the authorization decision in terms of logical deductions derived from the logical assertions.

15. The computer-implemented method as recited in claim 13, wherein the audit policy rules further include audit trigger rules that specify when the audit record is to be generated and added to an audit log, and wherein the audit trigger rules further specify that the audit record is to be generated and added to the audit log responsive to access requests involving a particular authorization decision result, a particular targeted resource, a particular requested action, and/or a particular operation on a particular resource.

* * * * *